United States Patent
Chasen et al.

(10) Patent No.: US 8,819,457 B2
(45) Date of Patent: Aug. 26, 2014

(54) SYSTEMS AND METHODS FOR CONTENT PLAYBACK AND RECORDING

(71) Applicants: Jeff Chasen, Redmond, WA (US); Jeff Leitner, Shoreline, WA (US); Jeff Buzzard, Seattle, WA (US); Timothy Graham, Seattle, WA (US); Stephen Roger Hastings, Kirkland, WA (US)

(72) Inventors: Jeff Chasen, Redmond, WA (US); Jeff Leitner, Shoreline, WA (US); Jeff Buzzard, Seattle, WA (US); Timothy Graham, Seattle, WA (US); Stephen Roger Hastings, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/049,047

(22) Filed: Oct. 8, 2013

(65) Prior Publication Data
US 2014/0140181 A1     May 22, 2014

Related U.S. Application Data

(63) Continuation of application No. 12/483,107, filed on Jun. 11, 2009, now Pat. No. 8,555,087.

(60) Provisional application No. 61/095,249, filed on Sep. 8, 2008.

(51) Int. Cl.
*H04L 29/06*     (2006.01)

(52) U.S. Cl.
USPC ............. 713/193; 713/189; 726/26; 380/200; 380/201

(58) Field of Classification Search
USPC ............. 713/189, 193; 726/26; 380/200, 201
See application file for complete search history.

(56) References Cited

U.S. PATENT DOCUMENTS

| | | | |
|---|---|---|---|
| 5,822,142 A * | 10/1998 | Hicken | ............................ 360/53 |
| 5,832,088 A | 11/1998 | Nakajima et al. | |
| 6,069,952 A | 5/2000 | Saito et al. | |
| 6,408,406 B1 | 6/2002 | Parris | |
| 6,798,972 B1 | 9/2004 | Ito et al. | |
| 7,027,373 B2 | 4/2006 | Ueda et al. | |
| 7,065,019 B2 | 6/2006 | Park et al. | |
| 7,079,752 B1 | 7/2006 | Leyendecker | |
| 7,353,543 B2 | 4/2008 | Ohmori et al. | |
| 7,356,246 B1 | 4/2008 | Kobb | |
| 7,464,125 B1 | 12/2008 | Orszag et al. | |
| 7,490,265 B2 | 2/2009 | Baskey et al. | |
| 7,555,779 B2 | 6/2009 | Nakano et al. | |
| 7,647,277 B1 | 1/2010 | Blumenfeld et al. | |
| 8,033,909 B2 | 10/2011 | Collar et al. | |
| 8,135,761 B2 | 3/2012 | Watson et al. | |

(Continued)

FOREIGN PATENT DOCUMENTS

| | | |
|---|---|---|
| WO | WO2009154948 | 12/2009 |
| WO | WO2009154949 | 12/2009 |

OTHER PUBLICATIONS

Office Action mailed Jan. 20, 2011 in U.S. Appl. No. 12/332,110, filed Dec. 10, 2008.

(Continued)

*Primary Examiner* — Chau Le
(74) *Attorney, Agent, or Firm* — Stoel Rives LLP

(57) ABSTRACT

A method for content playback and recording may include using a computer to obtain media content from a recorded medium. Concurrently with obtaining the media content, the method may include reencrypting the encrypted media content using a secondary encryption key and storing the reencrypted media content in a storage device.

13 Claims, 13 Drawing Sheets

(56) References Cited

U.S. PATENT DOCUMENTS

| | | | |
|---|---|---|---|
| 2002/0051494 A1 | 5/2002 | Yamaguchi et al. | |
| 2002/0145966 A1 | 10/2002 | Hirotsune et al. | |
| 2003/0158861 A1 | 8/2003 | Sawdon et al. | |
| 2003/0163823 A1 | 8/2003 | Logan et al. | |
| 2004/0022521 A1 | 2/2004 | Kishi et al. | |
| 2004/0128497 A1 | 7/2004 | Hoshino | |
| 2005/0152675 A1 | 7/2005 | Hanes | |
| 2005/0169467 A1 | 8/2005 | Risan et al. | |
| 2005/0182328 A1 | 8/2005 | Matsumoto et al. | |
| 2005/0226320 A1 | 10/2005 | Lambert et al. | |
| 2005/0232577 A1 | 10/2005 | Green | |
| 2006/0064716 A1 | 3/2006 | Sull et al. | |
| 2006/0114787 A1 | 6/2006 | Festal et al. | |
| 2006/0195909 A1 | 8/2006 | Boswell et al. | |
| 2007/0053513 A1 | 3/2007 | Hoffberg | |
| 2007/0061364 A1 | 3/2007 | Klein, Jr. | |
| 2007/0079145 A1 | 4/2007 | Saito | |
| 2007/0182700 A1 | 8/2007 | Baba et al. | |
| 2007/0217769 A1 | 9/2007 | Super et al. | |
| 2007/0239699 A1* | 10/2007 | Murrells et al. | 707/4 |
| 2007/0257247 A1 | 11/2007 | Ando et al. | |
| 2007/0299873 A1 | 12/2007 | Jones et al. | |
| 2008/0010509 A1* | 1/2008 | Southerland et al. | 714/8 |
| 2008/0095339 A1 | 4/2008 | Elliot et al. | |
| 2008/0141133 A1 | 6/2008 | Yamamoto et al. | |
| 2009/0080870 A1 | 3/2009 | Mudie et al. | |
| 2009/0148125 A1 | 6/2009 | Watson et al. | |
| 2009/0150409 A1 | 6/2009 | Watson et al. | |
| 2009/0202068 A1* | 8/2009 | Qureshi et al. | 380/44 |

OTHER PUBLICATIONS

Office Action mailed Aug. 17, 2011 in U.S. Appl. No. 12/332,110, filed Dec. 10, 2008.

Office Action mailed Oct. 5, 2011 in U.S. Appl. No. 12/332,121, filed Dec. 10, 2008.

Office Action mailed Apr. 16, 2012 in U.S. Appl. No. 12/332,121, filed Dec. 10, 2008.

Notification of Transmittal of the International Search Report and the Written Opinion of the International Searching Authority, or the Declaration mailed Sep. 23, 2009 for PCT/US2009/47089.

Notice of Allowance and Fee(s) Due mailed Jul. 22, 2013, for U.S. Appl. No. 12/332,121, filed Dec. 10, 2008.

Office Action mailed Jan. 31, 2012 in U.S. Appl. No. 12/483,107, filed Jun. 11, 2009.

Office Action mailed Oct. 25, 2012 in U.S. Appl. No. 12/483,107, filed Jun. 11, 2009.

Office Action mailed Feb. 19, 2013 in U.S. Appl. No. 12/483,107, filed Jun. 11, 2009.

Notice of Allowance and Fee(s) Due mailed Jun. 3, 2013, for U.S. Appl. No. 12/483,107, filed Jun. 11, 2009.

Supplemental Notice of Allowability mailed Sep. 3, 2013, for U.S. Appl. No. 12/483,107, filed Jun. 11, 2009.

* cited by examiner

SYSTEMS AND METHODS FOR CONTENT PLAYBACK AND RECORDING

TECHNICAL FIELD

This disclosure relates to systems and methods for playing and saving digital media content.

SUMMARY OF THE INVENTION

According to one embodiment, a method may include using a computer to obtain media content from a recorded medium. Concurrently with obtaining the media content, the method may include reencrypting the encrypted media content using a secondary encryption key and storing the reencrypted media content in a storage device. The method may further include decrypting the reencrypted media content using the secondary encryption key to recover the encrypted media content and decrypting the encrypted media content using a primary encryption key to recover decrypted media content, both of which may occur concurrently with the storage of the reencrypted media content. The method may also include outputting the decrypted media content to a display device.

The secondary encryption key may be derived from an identifier associated with the computer. For example, the identifier may be a MAC address or a disc identifier. In another embodiment, the secondary encryption key is derived from a license associated with a software application for outputting the decrypted media content.

In one configuration, the media content is obtained from the recorded media at a higher rate than the media content is output to the display device. Thus, the media content may be fully copied from the recorded medium to the storage device before playback has concluded.

The stored media content may be made available for subsequent playback without the recorded medium. This process may include determining a media identifier associated with the recorded medium or media content, using the media identifier to obtain metadata relating to the stored media content through a network, and associating the metadata with the stored media content in the storage device. In one embodiment, at least a portion of the metadata is displayable in a user interface to enable selection of the stored media content. Thus, the media content may be obtained from the recorded medium and made available for subsequent playback without a prior copying step that occurs separate from playback of the media content.

A system in accordance with the above described embodiment may include a reader component to obtain media content from a recorded medium, an encryption component to reencrypt the media content using a secondary encryption key, and a storage component to store the reencrypted media content. The system may further include a first decryption component to decrypt the reencrypted media content stored in the storage device using the secondary encryption key to recover the encrypted media content, a second decryption component to decrypt the encrypted media content using a primary encryption key to recover decrypted media content, and a playback component to output the decrypted media content to a display device. In one embodiment, the obtaining, reencrypting, storing, decrypting, and outputting of the media content are performed concurrently for at least a portion of the media content.

The system may further comprising a user interface component for making the stored media content available for subsequent playback without the recorded medium. In addition, the system may include a metadata component to determine a media identifier associated with the recorded medium or media content, use the media identifier to obtain metadata relating to the stored media content through a network, and associate the metadata with the stored media content in the storage device, where at least a portion of the metadata is displayable in the user interface to enable selection of the stored media content. In one configuration, the first and second decryption components are components of a single device or application.

According to another embodiment, a method may include using a computer to obtain media content from a recorded medium. Concurrently with obtaining the media content, the method may include decrypting the media content using a first key, reencrypting the media content using a second key, storing the reencrypted media content in a storage device, decrypting the stored media content using the second key, and outputting the decrypted media content to a display device.

According to yet another embodiment, a method includes using a computer to detect that a recorded medium including media content has been inserted into a media reader and copy the media content from the recorded medium to a storage device without a user command to copy the media content. In one configuration, the computer may retrieve and play back the media content from the storage device in response to a user command to play back the media content, where at least a portion of the media content is played back from the storage device concurrently with the media content being copied from the recorded medium.

A system in accordance with the above described embodiment may include a reader component for detecting a recorded medium being inserted into a media reader and for copying the media content from the recorded medium to a storage device without a user command to copy the media content. The system may further include a playback component for playing back the media content from the storage device in response to a user command, where at least a portion of the media content is played back from the storage device concurrently with the media content being copied from the recorded medium.

According to still another embodiment, a method may include using a computer to read media content from a recorded medium, store the media content in a storage device concurrently with reading the media content, and play back the media content from the storage device concurrently with storing the media content, where the reading, storing, and playing back of the media content are initiated by a single user command. In one configuration, the single user command may be a command to play back the media content from the recorded medium.

A system in accordance with the above described embodiment may include a reader to read media content from a recorded medium, a storage device to store the media content concurrently with the reading of the media content, and a playback component to play back the media content from the storage device concurrently with the storing of the media content, where the reading, storing, and playing back of the media content are initiated by a single user command, such as a command to play back the media content from the recorded medium.

According to yet another embodiment, a method includes using a computer to read media content from a digital versatile disc (DVD) at first rate, store the media content in a hard drive concurrently with reading the media content, and play back the media content from the hard drive concurrently with storing the media content. In one implementation, the media content is played back from the storage device at a second rate that is lower than the first rate.

The media content may be subdivided on the DVD into one or more cells, with each cell comprising a plurality of sectors. The process of reading the media content may include incrementing a bad sector counter in response to encountering an unreadable sector. The process may also include clearing the bad sector counter in response to encountering a readable sector.

When the bad sector counter for a cell exceeds a determined threshold value, the process may include marking the cell as a bad cell, such that subsequent reading of the cell is not attempted. The process may then skip to a next cell to continue reading the media content.

A system in accordance with the above described embodiment may include a DVD reader for reading media content from a DVD at first rate, a hard drive for storing the media content concurrently with the reading of the media content, and a playback device for playing back the media content from the hard drive concurrently with the storing of the media content, where the media content is played back from the hard drive at a second rate that is lower than the first rate.

According to another embodiment, a method includes using a computer to read blocks of media content starting from a first location of a recorded medium. Concurrently with reading the media content, the method may include storing a copy of each block read from the recorded medium in a storage device, marking which blocks of the recorded medium have been stored in a data allocation map, and playing back the media content from the storage device.

In response to copying the last block of the media content or in response to playback being terminated by the user, the method may include reading and storing a copy of each block of the recorded medium that has not been marked in the data allocation map as being stored in the storage device.

In one configuration, the method may include receiving a user command to skip to reading media content from a second location of the recorded medium. In response to the data allocation map indicating that a first block at the second location has not been stored, the method may repeat the reading, storing, marking, and playing back steps starting from the second location. In response to the data allocation map indicating that a first block of the second location has been stored, the method may include playing back the media content corresponding to the second location of the recorded medium from the storage device.

A system in accordance with the above described embodiment may include a reader component to read blocks of media content starting from a first location of a recorded medium. The system may further include a storage device to store a copy of each block read from the recorded medium concurrently with the reading of the media content. The storage device may also be used to store a data allocation map for marking which blocks of the recorded medium have been stored. In one configuration, the system also includes a playback component to play back the media content from the storage device concurrently with the reading and storing of the media content.

According to still another embodiment, a method includes using a computer to detect that a recorded medium has been provided to a media reader and, without further user interaction, determine a media identifier for the recorded medium. The method may also include using the media identifier to determine whether media content from the recorded medium has been previously stored. In response to the media content having not been stored, the method may obtain metadata for the media content from a metadata provider based on the media identifier and prompt a user with at least a portion of the metadata. In response to a user command to play the media content, the method may read media content from the recorded medium, store the media content in a storage device concurrently with reading the media content, and play back the media content from the storage device concurrently with storing the media content.

According to yet another embodiment, a method may include using a computer to copy a first content item from a first recorded medium, copy a second content item from a second recorded medium, and determine respective media identifiers for the first and second recorded mediums. The method may also include using the respective identifiers to obtain metadata for the first and second content items, determine a group association for the first and second content items from the metadata, and represent the first and second content items as a group in a user interface. While playing back the first content item, and upon navigating beyond a last portion of the first content item, the method may include navigating to a first portion of the second content item without user input.

DETAILED DESCRIPTION OF PREFERRED EMBODIMENTS

Figure 1:
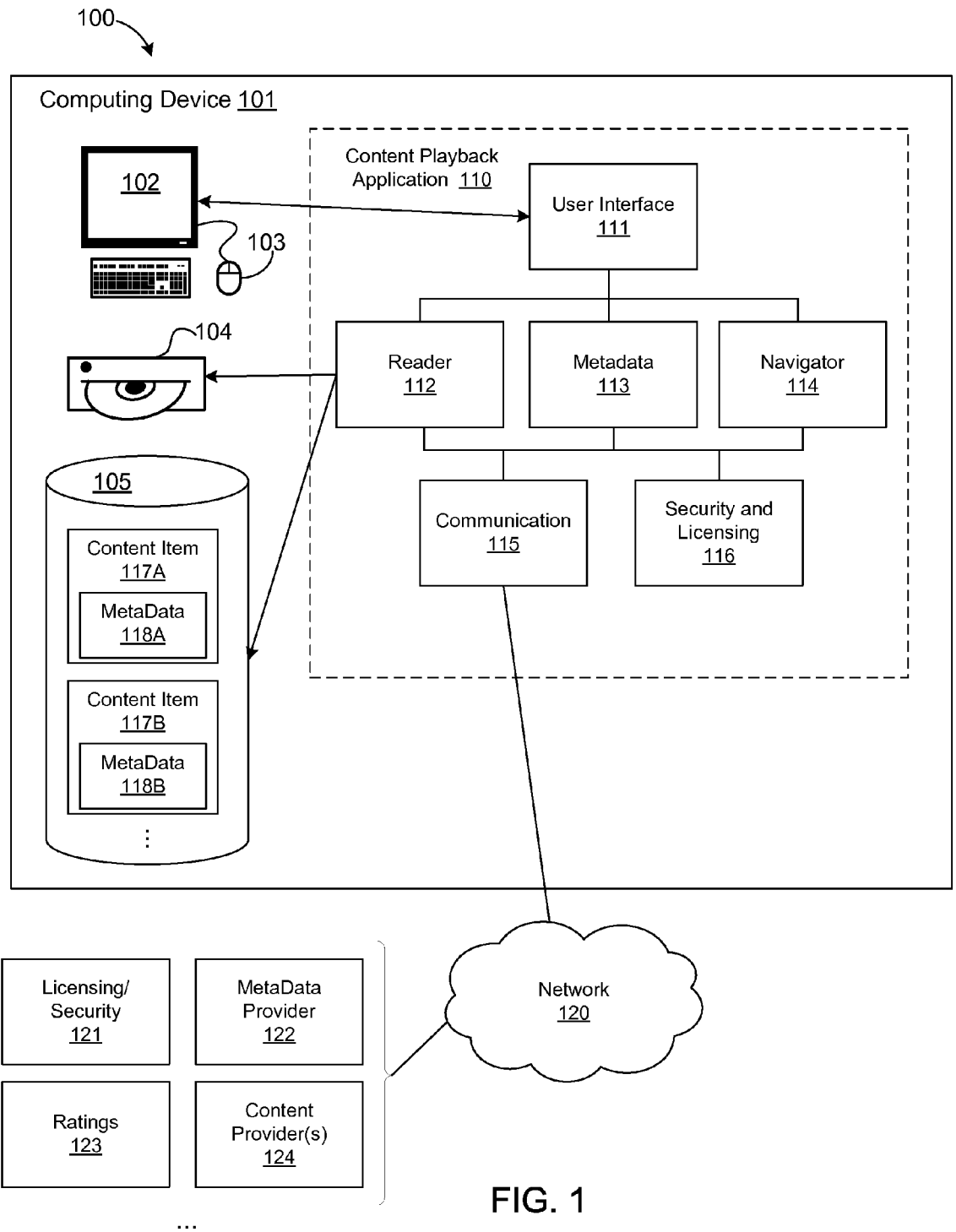
FIG. 1 is a block diagram of one embodiment of a system for playing and saving content.

FIG. 1 is a block diagram of a system 100 for playing and saving content. The system 100 may include a computing device 101, which may include, but is not limited to, a desktop personal computer (PC); a tablet PC; a laptop or notebook computer; an ultra-portable computer; a smart phone; a media center or set top box (STB); an entertainment console, such as a Microsoft® XBOX 360®, Sony® Playstation3®, or the like.

The computing device 101 may include a display 102, one or more input devices 103, and a media reader 104. The one or more input devices 103 may include a keyboard, touch screen, touchpad, voice input, mouse, track ball, or any other input mechanism known in the art. The media reader 104 may be configured to read media content (e.g., video and/or audio data) from a recorded medium, such as Compact Disc (CD) media, Digital Versatile Disc (DVD) media, Blu-Ray® media, solid-state memory device (e.g., flash drive) or the like. The computing device 101 may include and/or be communicatively coupled to storage media 105, which may include one or more solid state discs, hard drives, optical drives, or other types of storage media. As illustrated, the storage media 105 may be local to the computing device 101 or may be accessed remotely via a network.

Although not shown in FIG. 1, the computing device 101 may further include a processor, a memory comprising an operating system and other software (not shown), a video subsystem (not shown) to control the operation of the display 102, audio output circuitry (not shown), additional storage and/or network connections (not shown), and the like.

A content playback application 110 may run in conjunction with the computing device 101 (e.g., the computing device 101 may include and/or be communicatively couple to a device, such as the storage media 105, comprising computer-readable instructions defining the application 110).

The content playback application 110 includes a user interface module 111, which may be configured to display content on the display 102 and/or receive user input via the input devices 103. The user interface 111 may allow a user (not shown) of the computing device 101 to control the operation of the application 110. Various embodiments of the user interface 111 are described in additional detail below in conjunction with FIGS. 2-7.

The user interface module 111 may be communicatively coupled to a reader module 112, which may be configured to read content from the media reader 104 of the computing device 101. Alternatively, or in addition, the reader module 112 may be configured to read content from external media sources over a network 120 using a communications module 115. The content playback application 110 may be configured to record the media content stored on a recorded medium (e.g., DVD disc) automatically upon detecting insertion of the recorded medium into the media reader 104. The recording may begin automatically and/or without user input. Alternatively, or in addition, the content playback application 110 may be configured to wait to record the content item until instructed to do so.

As used herein, a content item may refer to any content stored on a recorded media (e.g., DVD disc) and/or transmitted over a network. Accordingly, a content item may refer to media content, such as video content, audio content, text content, and the like. In some embodiments, a content item may comprise interactive content, such as a Flash® game, executable code, a presentation (e.g., a PowerPoint® presentation), interactive media, and the like.

The network 120 may include any communications network known in the art including, but not limited to, a Transmission Control Protocol/Internet Protocol (TCP/IP) network, the Internet, a Local Area Network (LAN), a Wide Area Network (WAN), a wireless network, or the like.

The content read by the reader module 112 may include multimedia content, such as a DVD movie or the like. The content items 117A, 117B, and so on read by the reader module 112 may be stored in the storage media 105. As will be discussed below, the reader module 112 may be configured to utilize the security and licensing module 116 to encrypt or otherwise protect the stored content items 117A-117B to prevent unauthorized distribution and playback thereof.

A metadata module 113 may be configured to obtain metadata related to one or more of the content items 117A-117B read by the reader module 112. The content items 117A-117B read by the reader 112 may include metadata content, such as a title, table of contents, credits listing, plot synopsis, or the like. This information may be obtained and/or processed by the metadata module 113. Alternatively, or in addition, the metadata module 113 may be configured to derive a media identifier associated with a particular content item 117A-117B. The identifier may be generated using various properties of the content item (e.g., the content item title, table of contents, and the like), and/or may include properties of the media associated with the content item (e.g., a disc identifier or the like).

After generating the media identifier, the metadata module 113 may be configured to obtain additional metadata related to the content item from a remote metadata provider 122. The remote metadata provider 122 may be accessible via the network 120 using the communications module 115. Alternatively, or in addition, the storage media 105 may include a database (not shown) or other data store comprising metadata information keyed to media identifiers. The database (not shown) may be installed as part of the content playback application 110 or another application (not shown).

After obtaining the metadata from the remote provider 122 or another source, the metadata module 113 may be configured to store the metadata in the storage media 105. The metadata 118A-118B may be stored in conjunction and/or association with a respective content item 117A-117B. In some embodiments, metadata 118A-118B associated with a content item 117A-117B may be used to organize the content item 117A-117B in a user interface. For instance, the metadata 118A and/or 118B may indicate that the content items 117A and 117B are related and, as such, may be grouped together. For example, the metadata 118A and 118E may indicate that the content items 117A and 117B both comprise episodes of the same season of a particular television series, and, as such, may be organized into a group (e.g., in a user interface display or the like). In some embodiments, the metadata of a group of content items may be combined. For example, the metadata associated with a group of content items comprising episodes of a particular television series may be combined into a single set of metadata. The combined metadata may be relevant to each of the content items in the group. The combined metadata may provide for convenient, seamless browsing and/or playback within the group. For example, if the content items each comprise a different set of episodes of a television series, the combined metadata may comprise a listing of all of the episodes available through the application. In some embodiments, the combined metadata may provide for seamless navigation between related content items. For instance, after completing playback of a first content item in a group, playback may continue at the beginning of a second content item in the group. For example, the first content item may comprise episodes 1-4 of a television series and the second content item may comprise episodes 5-8. As a user completes the playback of episode 4 (or navigates to a "next" chapter) of the first content item, the navigator 114 may continue playback at episode 5 of the second content item and so on.

As will be discussed below, in some embodiments, the stored metadata 118 may be user-editable. Accordingly, the metadata 118A-118B stored in the storage media 105 may be changed by a user (not shown) of the content playback application 110 via the user interface 111. Similarly, the metadata module 113 may be configured to query the remote metadata provider 122 periodically for updates to the stored metadata 118A-118B. Such updates may include enhancements, corrections, or other changes to the metadata associated with a particular content item. Upon detecting an update, the metadata module 113 may be configured to update the metadata 118A-118B stored in the storage media 105. The updating may further comprise transmitting any user-generated content and/or user-submitted changes to the metadata to the metadata provider 122. The user-generated content may include, but is not limited to: user-submitted metadata tags, user-submitted ratings, user-submitted reviews, descriptions, and the like. In some embodiments, the metadata provider 122 may be configured to incorporate user-generated content provided by one or more users and/or distribute the user-generated content to other users of the application.

A navigator module 114 may be configured to provide access to various portions of a particular content item 117A-117B. The user interface 111 may receive one or more commands from a user of the playback application 110, instructing the application 110 to display a particular portion of a content item 117A-117B. For example, a user of the content playback application 110 may instruct the application 110, through the user interface 111, to display a particular chapter of a DVD movie content item and/or fast forward to a particular point within the content item. Responsive to this request, the user interface 111 may instruct the navigator module 114 to obtain the portion of the content item requested by the user. Accordingly, the navigation module 114 may be configured to read the content items 117A-117B and/or parse the structure of the content items 117A-117B. As will be discussed below, the playback application 110 may be configured to play back recorded content, rather than reading the content directly from the media reader 104. If the navigator 114 requests a portion of a content item that has not yet been recorded and/or stored in the storage media 105, the navigator 114 may instruct the reader 112 to begin recording at the requested location and, after the recorder has begun storing the content item, the navigator may access the content from the storage media 105.

The navigation module 114 may use the metadata 118A-118B to provide for navigation within and/or between related content items 117A-117B. For example, and as discussed above, the content items 117A and 117B may comprise episodes of a particular television series. The content item 117A may comprise episodes 1-10 and the content item 117B may comprise episodes 1-20. If a user navigates from episode 10 of the content item 117A to a "next" context item (e.g., submits a "next chapter" navigation command to the navigator 114), the navigator 114 may be configured to navigate to episode 11 on content item 117B. In another example, the metadata 118A and 118B may indicate that the content items 117A and 117B are related, but are not organized into episodes. For instance, the content items 117A and 117B may represent DVD discs of a two DVD disc set and/or may be two related DVD modes (e.g., the content item 117A may comprise Star Wars: Episode 1 and the content item 117B may comprise Star Wars: Episode 2). In this case, as the user finishes playback of the content item 117A (or navigates beyond the last chapter of the content item 117A), the navigation module 114 may be configured to navigate to a first chapter of the content item 117B.

In some embodiments, the content items 117A-117B stored in the storage media 105 may be encrypted using one or more security keys. For example, DVD movie content is typically encrypted using a content scrambling system, such as CSS. As will be discussed below, the content playback application 110 may include a security and licensing module 116 capable of reading content encrypted using CSS and/or another encryption and/or security scheme. The security and licensing module 116 may be configured to decrypt and/or unscramble content items 117A-117B requested by other modules within the application 110 (e.g., by the navigator module 114 and/or user interface 111) to allow those modules access to the content items 117A-117B.

Since the content items 117A-117B may be stored on the storage media 105 in an encrypted or otherwise secured state, the content items 117A-117B may be protected from unauthorized playback and/or export from the application 110. Alternatively, or in addition, in some embodiments, the security and licensing module 116 may be configured to add additional security measures to protect the content items 117A-117B. As will be discussed below, the security and licensing module 116 may re-encrypt the content items 117A-117B using a key derived, for example, from the computing device 101 (e.g., a hardware identifier, such as a disc ID, MAC address, or the like) and/or a key derived from a license associated with the content playback application 110. The additional security measures may prevent the content items 117A-117B of a first user on a first computing device 101 from being transferred to and/or played back by a second user using a second computing device 101. Similarly, the additional security measures may prevent the content items 117A-117B from being made available to other users via a network or to unauthorized and/or unlicensed instances of the playback application 110.

In some instances, the security and licensing module 116 may validate licensing and/or rights to the content items 117A-117B using a licensing and security service 121 accessible via a network. For example, the security and licensing module 116 may validate a license of the playback application 110, may query a digital rights management (DRM) system on the licensing and security service 121 to determine whether a particular user should be granted access to a particular stored content item 117A-117B, and the like.

The content playback application 110 may be configured to allow a user to view a particular content item on physical media (e.g., on a DVD disc inserted in the media reader 104) while concurrently caching the content item in the data storage media 105 for subsequent playback. In this way, a user may develop a library of content items (e.g., content items 117A-117B) while simultaneously viewing the content items, and, as such, the user need not engage in a separate step to cache the content items 117A-117B on the data storage media 105 (e.g., since the content items 117A-117B are stored as the user views the respective content items).

Most media readers 104 are capable of reading media faster than its playback speed. For instance, DVD disc readers are typically capable of reading data at 4× to 16× (four (4) to sixteen (16) times playback speed). Accordingly, the reader 112 may be capable of recording the content item in the data storage media 105 before the viewer is finished viewing the content item. The reader module 112 may be configured to read the content item using the media reader 104 at a high rate (e.g., 16× playback speed), while the navigator 114 and/or user interface 111 modules provide for concurrent playback at a standard playback rate (e.g., 1×).

Similarly, content obtained via the network 120 from a remote content provider 124 may be obtained at faster than viewing speed. As such, streamed or downloadable content may be recorded in the data storage media 105 similarly to disc-based media.

As a user instructs the navigator 114 (via the user interface 111) to display various portions of a particular content item, the reader 112 and/or navigator 114 may determine whether the requested content has been cached in the data storage media 105. If the content has been cached, the navigator may access the requested content in the storage media 105 and make the content available to the user interface 111 for display to the user. If the content is not cached in the storage media 105, the navigator may instruct the reader 112 to "skip ahead" in the media reader 104 and/or network stream from the remote content provider 124 to the requested content. The reader 112 may then resume caching the content item at the offset indicated by the user. In this case, the reader 112 may be configured to track the portions of the content item 117A-117B that have been cached and those that have not, e.g., in a data allocation map (DAM) or the like. In this case, after the reader 112 caches the portion of the content item requested by the user, it may be configured to cache the skipped portions of the content item in the data storage media 105.

As discussed above, the metadata module 113 may be configured to obtain metadata related to stored content items 117A-117B from a content provider 124. In addition, the metadata module 113 and/or user interface 111 may access a ratings service 123 to allow users to submit and/or access ratings of content items 117A-117B. In one embodiment, the licensing/security service 121, metadata provider 122, rating service 123, and content provider 124 may be the same entity or different entities.

Figure 2:
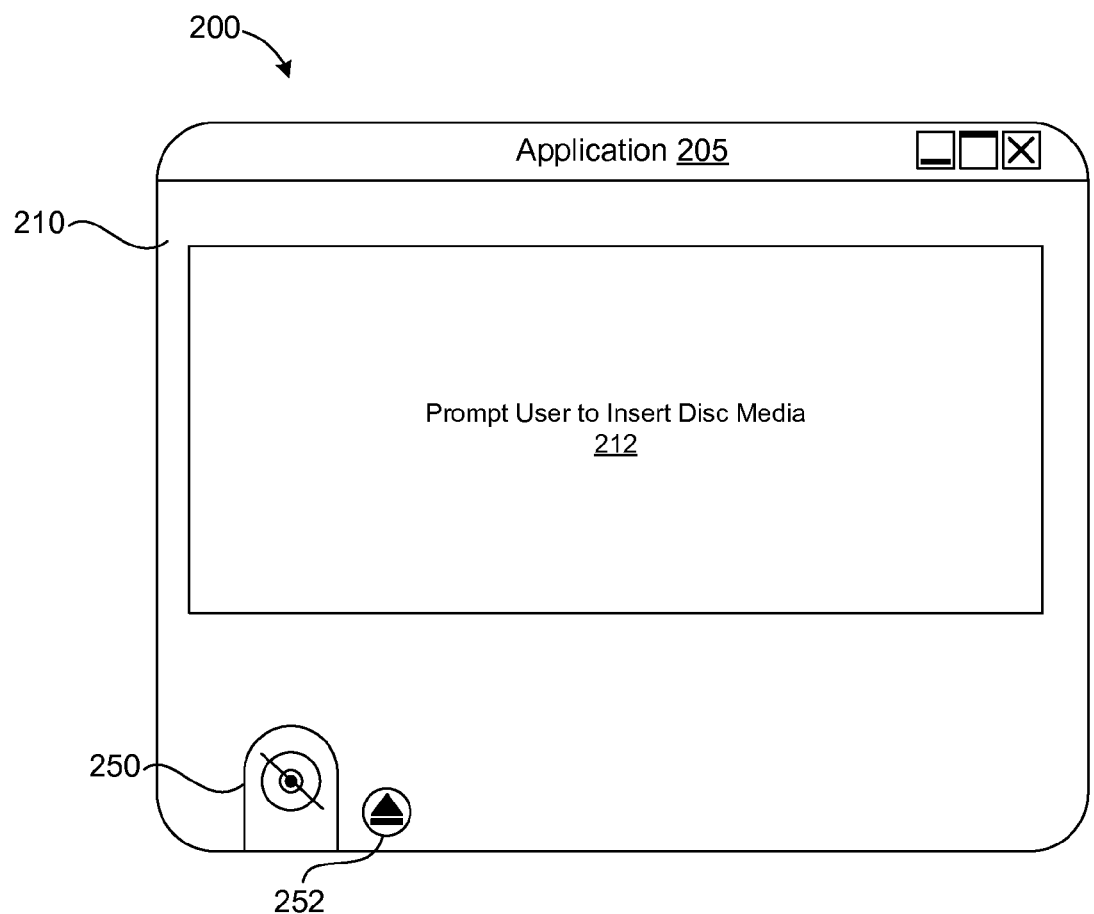
FIG. 2 is one embodiment of a user interface according to the teachings of this disclosure.

FIG. 2 shows one embodiment of a user interface 200 of a content playback application according to the teachings of this disclosure. The interface 200 includes an application frame 205, which may include a window, frame, or any other user interface element known in the art. The nature of the application frame 205 may vary depending upon an operating system and/or user interface toolkit used to implement the interface 200. For example, under Microsoft Windows®, Windows Forms® and/or Windows Presentation Foundation (WFC) elements may be used. Alternatively, the interface 200 may be implemented as an Adobe® Flash application, Microsoft Silverlight®, web browser components, or the like.

The application frame 205 includes a display area 210 upon which the user interface elements may be displayed. The interface of FIG. 2 may be displayed the first time the interface 200 is invoked and/or before the application has cached any content items (e.g., movies, TV episodes, or the like) for the user. Accordingly, the interface may display a message area 212, prompting the user to insert a disc comprising a content item (e.g., a DVD disc, Blu-Ray® disc or the like) to begin using the application. Alternatively, or in addition, the message area 212 may prompt the user to browse to and/or input a Uniform Resource Indicator (URI), from which a content item may be obtained via a network connection, such as a streaming video service or the like. In these embodiments, the interface 200 may include links to one or more partner online video services, which may provide content to users via the application 200.

As shown in FIG. 2, a media status indicator 250 may show that no disc is currently inserted into the one or more media readers accessible to the application. The interface 200 may further include an ejection control 252 to eject media inserted into the reader.

Figure 3A:
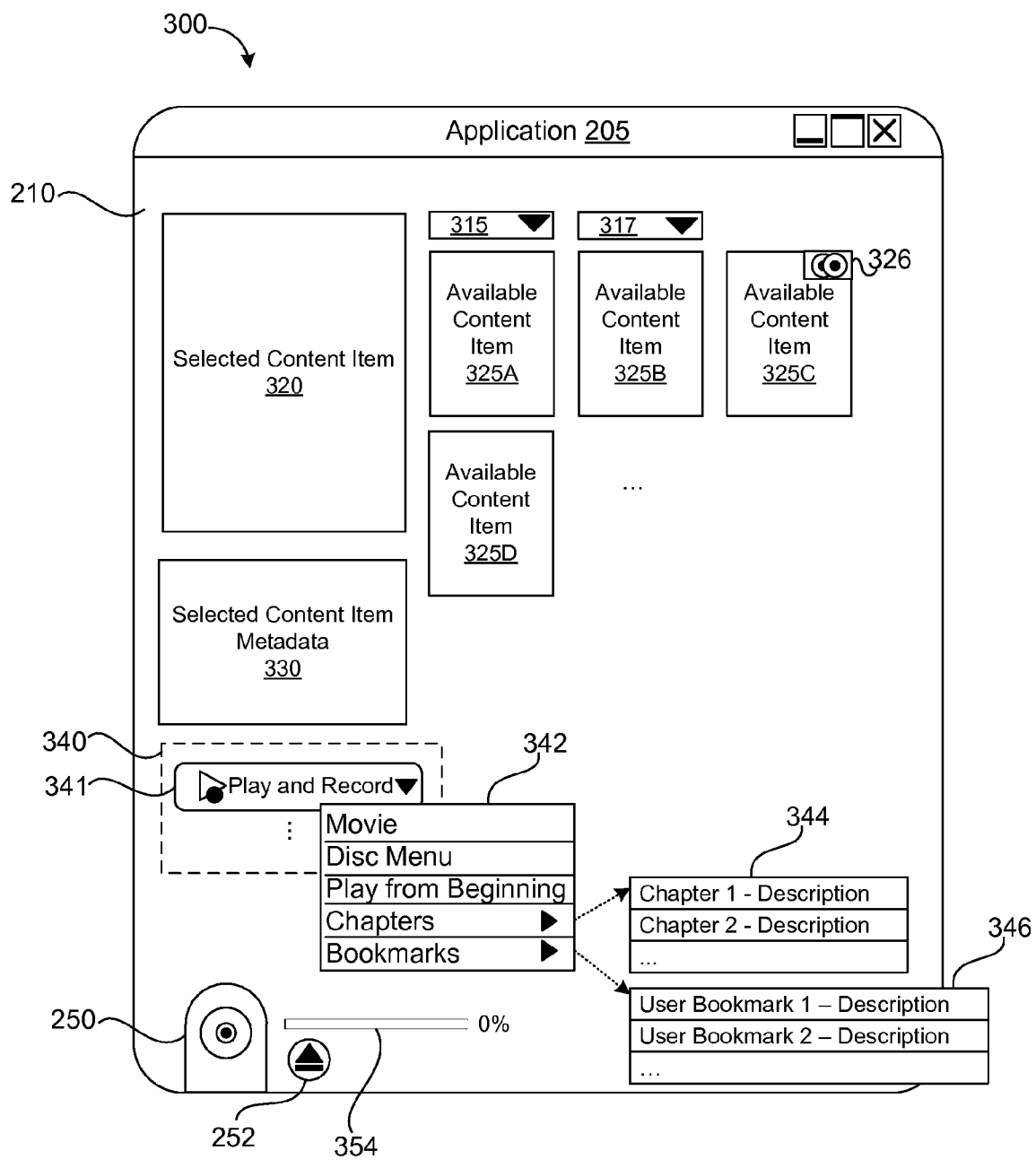
FIG. 3A is another embodiment of a user interface according to the teachings of this disclosure.

FIG. 3A shows one embodiment of a user interface 300 according to the teachings of this disclosure. The interface 300 of FIG. 3A may be displayed responsive to a user inserting a disc into the computing device and/or providing a URI comprising a downloadable and/or streaming content (e.g., responsive to user interface 200 of FIG. 2).

The display area 210 of the application frame 205 may include a display 320 comprising a graphical image or other identifier associated with the currently inserted disc and/or remote (e.g., downloadable and/or streamable) content. The display 320 may include a graphical representation of the content item (e.g., movie, television program, or the like, such as an image of a cover of a DVD movie). The image shown on the display area 320 may be obtained by a metadata module or other component from a remote and/or local metadata database. Alternatively, or in addition, the image displayed in the display area 320 may be obtained from the inserted disc and/or remote content source.

The display area 310 may further include a metadata display area 330, which may display metadata relating to a content item. The metadata displayed in the area 325 may include, but is not limited to, a plot synopsis of the content item, a brief description of the content item, the actors featured in the content item, the director of the content item, the publisher of the content item, and the like.

As discussed above, the application may have previously cached other content items. These available content items may be displayed in respective display areas 325A-325D on the display area 210. The display areas 325A-325D may include reduced size (e.g., thumbnail) graphical image of the content item (e.g., a reduced size image of a DVD cover of a movie).

Figure 6:
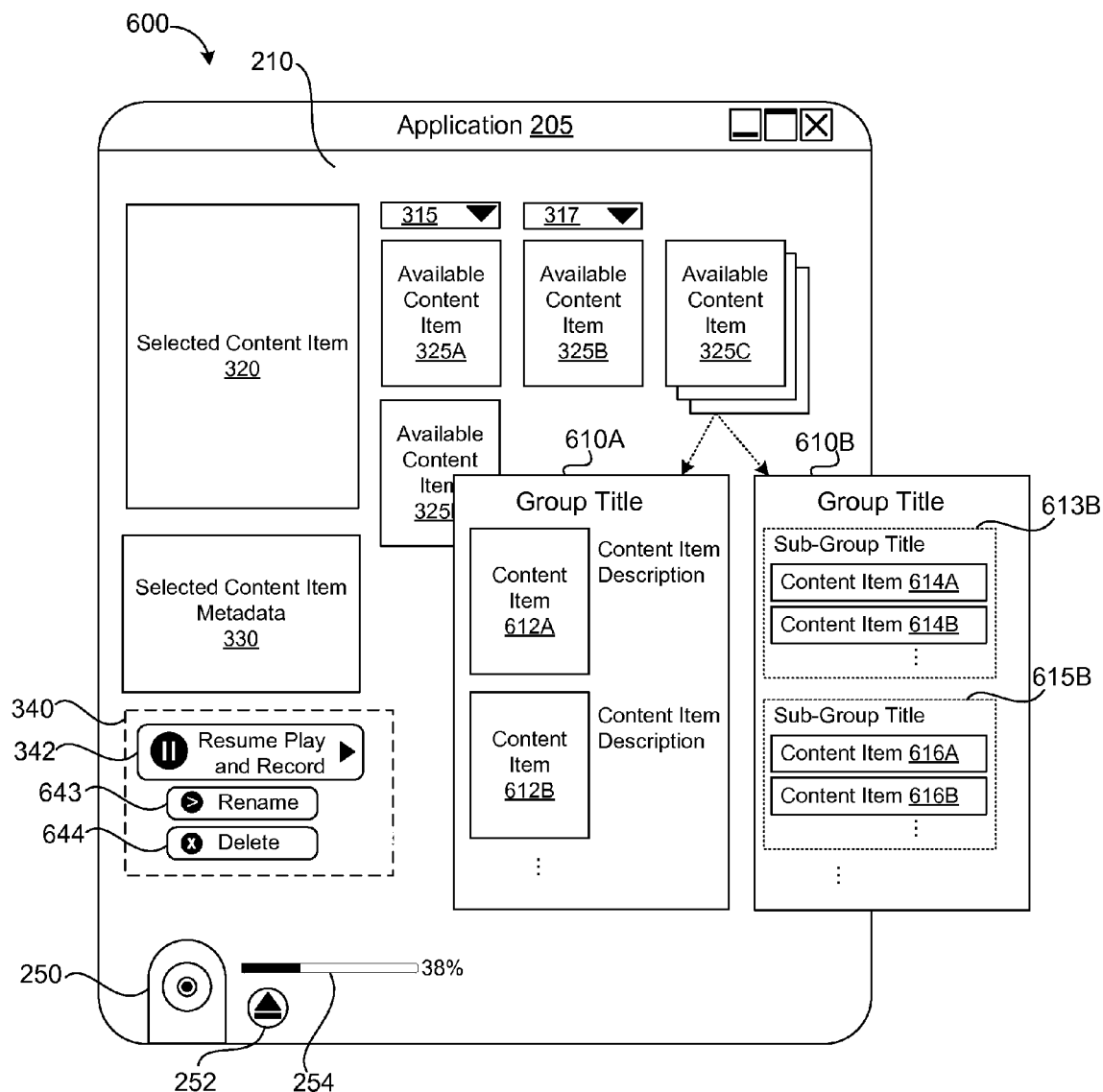
FIG. 6 is one embodiment of a user interface for organizing content items according to the teachings of this disclosure.

As discussed above, content items may be grouped together using, inter alia, metadata associated with the content items. One or more of the display areas 325A-325D may be adapted to display a group of content items. In the FIG. 3A example, an indicator 326 is overlaid on the display area 325C. The indicator 326 may be used to indicate that display area 325C represents a group of related content items. For example, the display area 325C may represent a set of DVD discs comprising episodes of a particular television program, a set of related movies (e.g., Star Wars Episode 1, Star Wars: Episode 2, and so on), a multi-disc DVD movie, or the like. Selection of the display area 325C may provide access to all of the content items in the particular group. FIG. 6 provides an example of an interface adapted to display a group of content items (elements 610A and 610B), as well as another example of a display area comprising an indicator that the display area refers to a group of content items. See element 325C of FIG. 6.

The display area 210 may include a filter control 315. The filter control 315 may allow a user filter the available content items displayed within the display area 210 based on one or more criteria, such as a genre, Motion Picture Association of America (MPAA) rating, television content rating, age appropriateness, language, review rating, or the like.

Figure 3B:
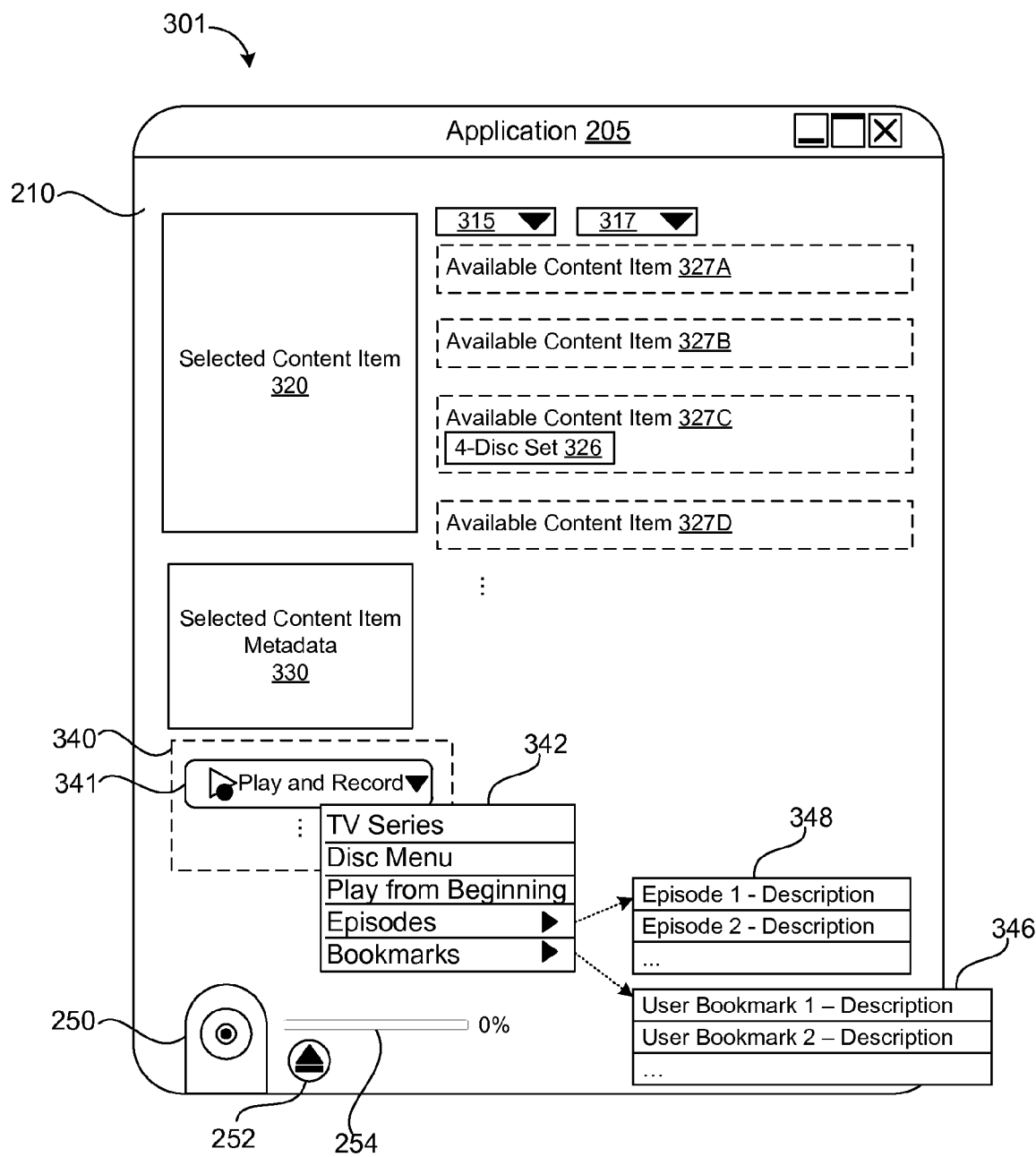
FIG. 3B is another embodiment of a user interface according to the teachings of this disclosure.

The display area 210 may also include a display control 317, which may be used to modify the way the available content display areas 325A-325D are displayed within the display area 210. For example, the available content display areas 325A-325C may be arrayed in a grid pattern, as shown in FIG. 3A. Alternatively, the control 317 may cause the content display areas 325A-325D to be displayed as a list (as shown in FIG. 3B) or in some other arrangement.

A status display 250 may provide an indication that media is currently inserted into a media reader accessible to the application and an eject control 252 may allow a user to eject the disc therefrom. A completion indicator 354 may show how much of the content item has been recorded. As shown in FIG. 3A, before beginning playback and/or recording a content item, the indicator 354 may show that recording is 0% completed.

The display area 210 may further include controls 340, which may include a play and record control 341. Selection of the play and record control 341 may cause the application to begin recording and playing the selected content item (e.g., the content item inserted in the media reader of the computing device and/or at the URI provided by the user). Alternatively, or in addition, recording may begin automatically upon insertion of a recorded medium into a media reader. As the content item is presented in the display area 210, the application may simultaneously record the content item for future playback. The recording may be performed concurrently with the playback (e.g., the content item may be recorded as it is presented to the user). As described above, the application may be configured to record the content to a storage media (e.g., disc or other storage media) accessible to the application. The application may be configured to playback the recorded content item (e.g., the content item stored on the disc or other storage media), rather than playing the content item directly from the DVD disc (or other content item source). The application may be configured to record the content item at a high rate (e.g., 16× playback speed), while providing for playback of the content item at a standard playback rate.

The play and record control 341 may be configured to receive a single input from a user. The input may cause the application 205 to begin recording and playing a content item. In addition, the play and record control 341 may make a plurality of options available to the user via a menu 342. The menu 342 may be invoked by selecting a particular region and/or icon on the play and record control 341. The options presented on the menu 342 may include, but are not limited to, an option to access a menu feature of a content item (e.g., a DVD main menu); an option to begin playing a movie content item (e.g., skipping the DVD main menu); an option to select one of a plurality of content item chapters; an option to select one of a plurality of content item bookmarks; and the like.

Selection of the option to select one of a plurality of content item chapters may cause a menu 344 to be displayed, which may include a listing of one or more chapters (or other content delimiters) of the content item. Selection of the option to select one of a plurality of bookmarks may cause a menu 346 to be displayed, which may include a listing of one or more user created bookmarks to be displayed. As will be discussed below, the application may allow a user to create bookmarks within a content item. The menu 348 may allow a user to jump directly to such bookmarks.

In some embodiments, the contents of the menu 342 may be modified according to the type of content item selected in the application 205. The FIG. 3A embodiment illustrates one example of menu items applicable to a DVD movie content item. However, one skilled in the art would recognize that other menu item 342 entries would be useful for other content item types (e.g., television episodes or the like). One example of a menu 342 adapted to display entries relevant to a television series is described below in conjunction with FIG. 3B.

FIG. 3B shows another embodiment of a user interface 301 according to the teachings of this disclosure. In the FIG. 3B example, the available content item displays 327A-327D may be presented on the display area 210 in a list format. The list displays 327A-327D may include a title of the respective content items and/or a brief description of the content items. In some embodiments, the list displays may include a thumbnail image (not shown) representing the respective content items.

One or more of the content item displays 327A-327D may be adapted to indicate that the display 327A-327D refers to a group of content items (e.g., plural DVD-discs). In the FIG. 3B example, display 327C includes an indicator 326, which may be used to indicate that the display 327C refers to a group of content items. As shown in FIG. 33, the indicator 326 may specify the number of DVD discs comprising the group (e.g., "4-disc set").

In the FIG. 33 embodiment, selected the content item may refer to a content item group (e.g., the display 327C may be selected). As discussed above, a content item group may comprise episodes of a television series, which may span plural DVD discs. The menu 342 may include options relevant to the selected television series. For example, the menu 342 may include an episode list menu 348, which may allow a user to navigate to one of a plurality of episodes in the television series. As discussed above, a television series may span multiple DVD discs. However, the menu 348 may aggregate all of the episodes in the series, regardless of the DVD disc boundaries (e.g., the menu 348 may not be restricted to displaying only the episodes on a particular DVD disc, but may display all of the episodes of the television series available through the application 205).

Selection of an input associated with a particular content item or group of content items (e.g., selecting display area 320 and/or one of the display areas 325A-325D) may cause the application 205 to display additional information about the selected item.

Figure 4A:
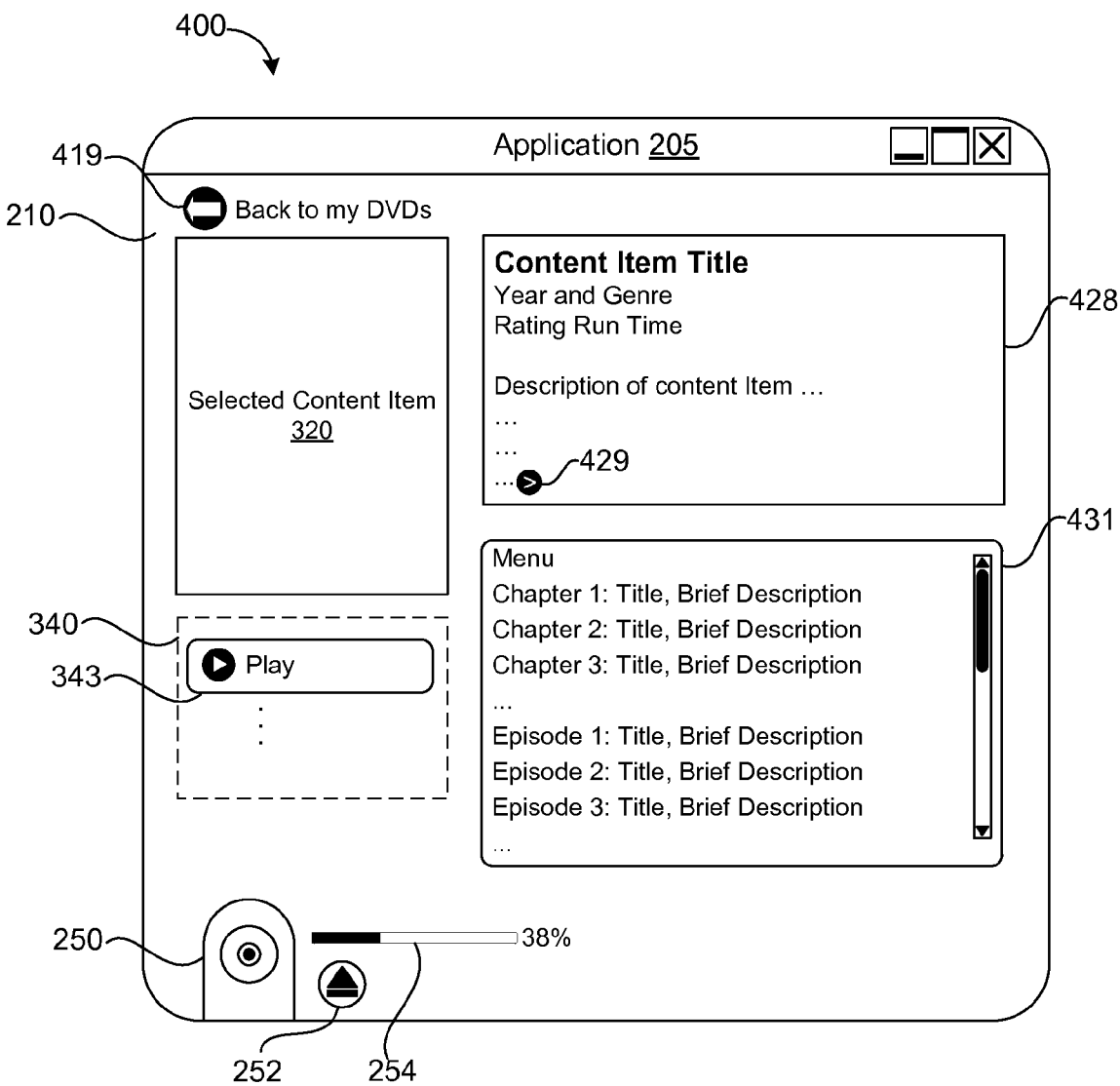
FIG. 4A is one embodiment of a user interface for displaying information related to a content item and/or group of related content items according to the teachings of this disclosure.

FIG. 4A shows one embodiment of a user interface 400 for displaying information about a particular content item and/or content item group. The display area 210 may include a navigation control 419, which may be used to navigate to a content item-listing interface, such as the user interface 300 and/or 301 of FIGS. 3A and/or 3B. The display 210 may include controls 340. For example, a play control 343 may provide for playing back a selected portion of the content item. Additional controls, such as a delete control (not shown) for deleting the content item (e.g., from the storage media 105), an edit control (not shown) to edit the name and/or image associated with the content item, and the like may also be provided.

The display area 210 may include a display 428 comprising metadata related to the content item (e.g., a rating, run time, and/or description of the content item and/or content item group). The metadata may be associated with a single content item (e.g., a single DVD movie) and/or may comprise metadata associated with a group of content items spanning multiple recorded mediums (e.g., multiple DVD discs). In some embodiments, the display 428 may include an input 429, the selection of which may cause an expanded view of the metadata to be displayed. One example of an expanded metadata display is described below in conjunction with FIG. 4B.

A list interface 431 may provide access to various portions of the content item. For example, if the content item is a DVD movie, the interface 431 may include a menu selection, chapter selections, and the like. If the content item comprises a television series, the interface 431 may include a listing of the television series episodes. The episodes listed in the interface 431 may span multiple DVD discs.

Although not shown in FIG. 4A, the display 210 may further comprise a rating interface (not shown), the selection of which may allow the user to submit a rating of the content item, an update interface (not shown), the selection of which may cause the application 205 to transmit a request to a metadata provider (e.g., the metadata provider 122 of FIG. 1) for updated metadata, and the like.

The application 205 may be in the processes of caching a content item. A progress indicator 254 on the display 210 may show the status of the recording processes. In the FIG. 4A example, the progress bar shows that 38% of the content item has been recorded. If no DVD disc is currently inserted and/or has already been fully backed up, components 250, 252, and/or 254 may be omitted. As discussed above, in some embodiments, the application 205 (and/or the content playback application 110 of FIG. 1) may be configured to begin recording a content item automatically (e.g., upon detecting insertion of a DVD disc into a media reader).

Figure 4B:
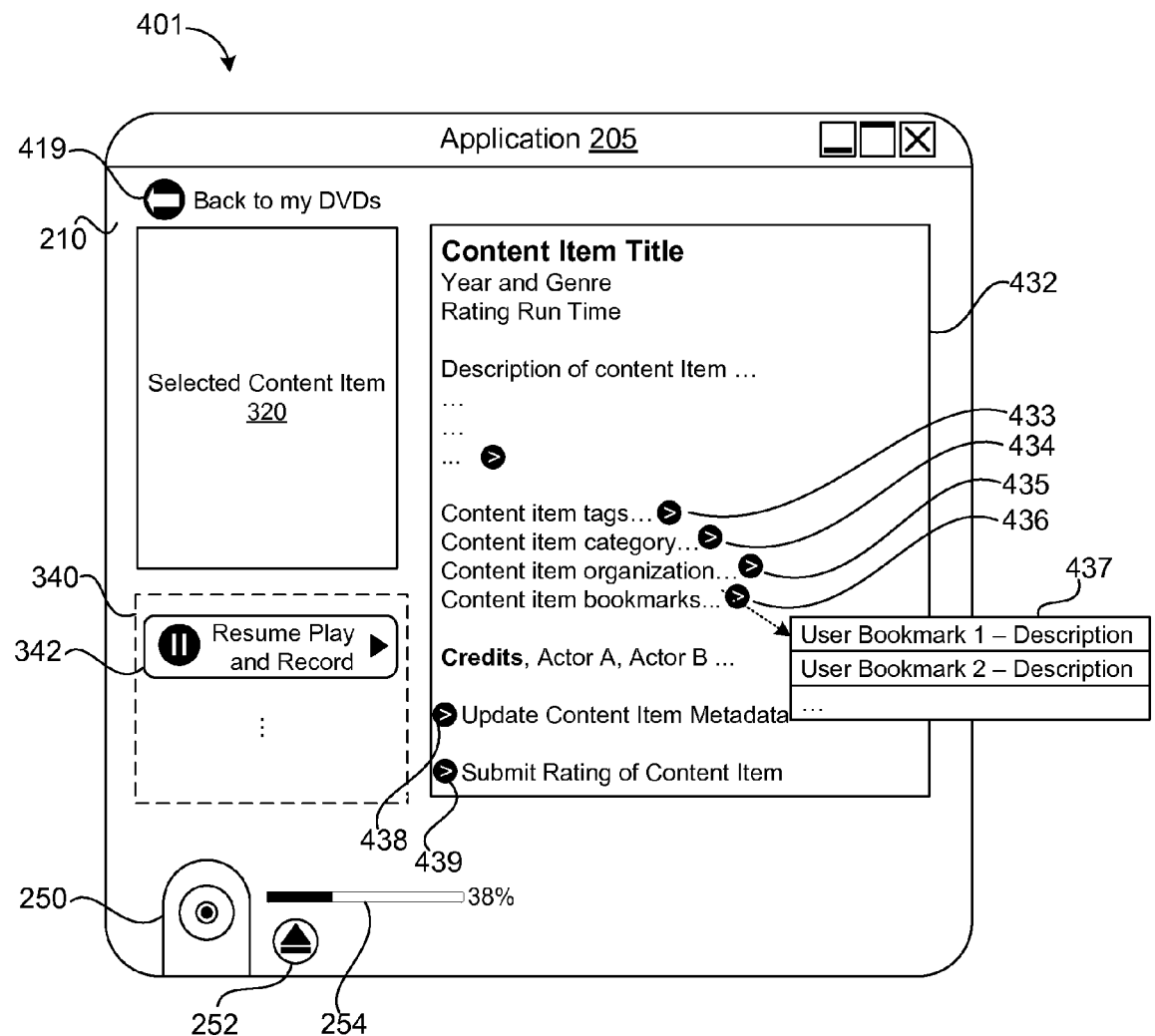
FIG. 4B is one embodiment of a user interface for displaying metadata associated with a content item according to the teachings of this disclosure.

FIG. 4B shows one embodiment of a user interface 401 for displaying additional metadata information related to a content item. The display area 210 of FIG. 4 may include a navigation control 419, which may be used to return the user to a content item-listing interface, such as the user interface 300 and/or 301 shown in FIGS. 3A and 3B.

The display area 210 may further include a metadata display and editing area 432, which may display various metadata items associated with the content item, including, but not limited to, content item title, publication year, content item genre, content item run time, description of the content item, tags associated with the content item, a category of the content item, content item credits, content item rating, and the like.

The content item metadata and editing area may include one or more edit controls 433, 434, 435, and 436. Selection of one of the controls 433, 434, 435, and 436 may allow a user to add, delete, and/or modify metadata. The edit control 433 may allow the user to add, delete, and/or modify tags associated with the content item. The tags may include descriptive terms associated with the content item. A category edit control 434 may be used to add, delete, and/or modify a category applied to the content item (e.g. horror, action, children, etc.)

An edit control 435 may be provided to allow users to add, delete, and/or modify an organization of the content item within other content items available to the application. In some embodiments, content items may be organized into groups comprising multiple content items. The groups may be automatically detected from the nature of the content item (e.g., by detecting that the content item is part of a particular series of content items) and/or the groupings may be manually created by a user. For example, a plurality of "Lord of the Rings" content items (e.g., DVD movies) may be organized into a "Lord of the Rings" series comprising a "Fellowship of the Ring" content item, a "The Two Towers" content item, and/or a "The Return of the King" content item. Similarly, a content item grouping may include content items of a television program series (e.g., content items comprising one or more episodes of one or more seasons of a television or other program). The content items in a group may span multiple recorded medium discs (e.g., multiple DVD discs). Content item groupings may be determined automatically based on metadata associated with the content items. For example, content items that are part of the same television series may be automatically grouped together. Alternatively, or in addition, content item groups may be created manually. For example, a user may create custom groups comprising any number of content items (e.g., a "favorite science fiction movies" group, a "romantic comedies" group, and so on).

The edit control 436 may allow users to add, remove, and/or modify the organization of various content items within such groupings. Although not shown in FIG. 4, the edit interface invoked by the edit control 436 may include a hierarchical tree view of the content items available in the application, which may allow users to move the content items within the hierarchy as desired. However, any group-editing interface could be used under the teachings of this disclosure.

An edit control 436 may allow users to add, remove, and/or modify user bookmarks associated with the content item. As discussed above, a content item may include a one or more user provided bookmarks demarking particular locations within the content item. The edit control 436 may allow a user to access a listing 437 of the bookmarks of a particular content item. The listing 437 may be editable to allow a user to change the name, description, and/or other attributes of the bookmarks.

A control 438 may be provided to cause the application to update the metadata information displayed in the metadata display and edit area 432. As discussed above, in some embodiments, metadata may be obtained from a remote and/or third party metadata provider. The metadata available from the provider may be enhanced over time. Selection of the control 438 may cause the application to query and/or obtain any available metadata updates from the provider. Upon updating, the metadata display and edit area 432 may be updated to show any changes.

A rating input 439 may be provided to allow a user to submit and/or view ratings of the content item. User ratings provided via the input 439 may be submitted to a metadata provider 122, ratings service 123. and/or content provider 124 (shown in FIG. 1) The ratings of other users may be aggregated and displayed in the metadata display and edit area 432. In some embodiments, the ratings of content items submitted by a particular user may stored and/or analyzed by a service (rating service, metadata provider, or the like) for use in a recommendation engine to suggest content items, which may be of interest the user.

As shown in FIG. 4B, the user may have already begun playing and/or recording the content item. Accordingly, the progress indicator 254 may show the recording progress of the content item (the progress bar shows that 38% of the content item has been recorded). Alternatively, if no physical media is present (e.g., no DVD disc is inserted in the reader 104) and/or if the content items has already been fully recorded, the components 250, 252, and/or 254 may be omitted from the display 210.

The user interface 400 includes a control area 340, which may include a play and record control and/or resume play and record control 342. The resume play and record control 342 may be displayed if the user has already begun the playing and/or recording the content item. Selection of the input 342 may cause the application to resume playing the content item where the user left off. In addition, the application may resume recording the content item. Alternatively, the application 205 may be configured to continue recording the content item while playback is paused. Although not shown in FIG. 4, the resume play and record input 342 may provide various play options similar to those shown in FIG. 3A and FIG. 3B including, but not limited to, an option to resume playing from the beginning of the content item, resume playing at a menu of the content item, playing at a particular chapter of the content item, playing at a particular bookmark of the content item, or the like.

Figure 5:
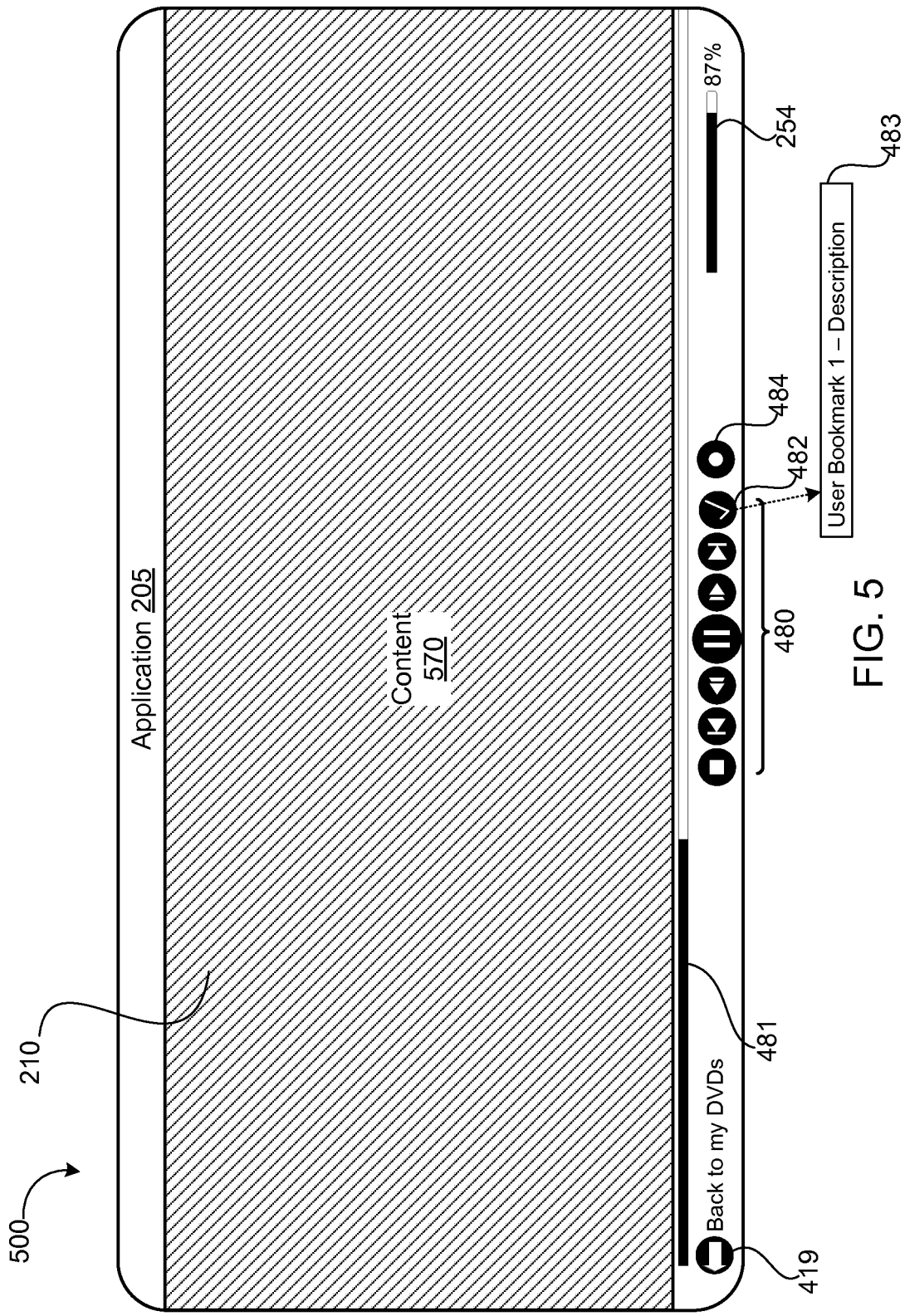
FIG. 5 is one embodiment of a user interface for playing a content item according to the teachings of this disclosure.

Selection of the resume play and record control 342 and/or the controls 341 of FIGS. 3A and/or 3B may cause the application to playback the content item. FIG. 5 shows one embodiment of a user interface 500 for playing back content according to the teachings of this disclosure.

The display area 210 of the interface 500 includes a content display area 570, which may be used to display the content item. The display area 210 may further include a progress indicator 481 showing the user's progress through the content item and a navigation component 419 to return the user to a content selection interface, such as the interfaces 300 and 301 of FIGS. 3A and 3B and/or interface 400 of FIG. 4.

Playback controls 480 may be provided to allow a user to control the playback of the content item. The playback controls may include, but are not limited to a pause control, a fast forward control, a fast reverse control, a chapter skip forward control, a chapter skip reverse control, a stop control, a record control, bookmark navigation controls, and the like. As discussed above, the operation of the playback controls 480 may be informed by the metadata associated with content item to allow for seamless navigation within a group of related content items. For example, a chapter skip forward command during playback of a last chapter of a first content item may skip to a first chapter of a second content item in the group and so on.

A bookmark control 482 may be provided, which may allow a user to create a bookmark at a selectable point within the content item. Selection of the bookmark control 482 may cause an edit control 483 to be displayed to receive a bookmark title and/or description from the user.

A record clip control 484 may be used to allow a user to record portions (e.g., clips) of the content item. The recorded clips may be stored separately from the content item recording discussed above. In some embodiments, the clips may be limited in length, screen resolution, sound quality, and the like. In addition, in some embodiments, content protection (e.g., encryption and the like) may be removed from the clips recorded using the input 484.

Similarly, although not shown in FIG. 5, a snap shot control may be provided, which may allow a user to capture a screenshot (e.g., still image) of the content item display area 570.

As discussed above, the application may be configured to group and/or arrange content items in various ways. In some embodiments, movie content items that are part of a series may be grouped together. Similarly, content items forming part of a television series may be grouped together. FIG. 6 shows one embodiment of a user interface configured to display content item groupings.

In the FIG. 6 embodiment, an available content item display 325C may be modified to show that it represents a plurality of content items. Other examples of such modifications are discussed above in conjunction with FIGS. 3A and 3B (e.g., using an indicator 326). As shown in FIG. 6, the display 325C has been modified to appear "stacked," which may indicate that the content item represented by the display 325C corresponds to plural DVD discs (e.g., a group of content items, such as a television series, related DVD movies, or the like). However, any modification to the display 325C known in the art could be used under the teachings of this disclosure. For example, the indicia displayed on the display 325C may indicate that 325C represents a content item grouping, the content item display 325C may be displayed in bold and/or having a shadow, or the like. As discussed above, FIGS. 3A and 3B provide additional examples of such indicia.

In some embodiments, selection of the display 325C may cause a group content item control to be displayed. Two examples of a group content item control are shown in FIG. 6 as element 610A and 610B. FIG. 6 shows the elements 610A and/or 610B displayed in conjunction with the interface 600. In other embodiments, however, the elements 610A and/or 610B could be displayed in separate, independent interfaces (not shown).

The group content item control 610A may include a group title to identify the content item group (e.g., the "Lord of the Rings Trilogy"). In some embodiments, the title may be based upon metadata associated with the content item(s). Alternatively, or in addition, the title may be provided and/or edited by a user of the application 205.

The group content item control 610A may include a plurality of content item displays 612A-612B. Each of the content item displays 612A-612B may correspond to a content item within the group (e.g., one DVD disc). Although not shown in the 610A example, one or more of the content item displays 612A-612B may refer to another group. For example, the group could comprise episodes of a particular television series. The content items within the group (e.g., 612A, 612B, and so on), may represent respective seasons of the television program (e.g., Lost season 1. Lost season 2, and so on), which each may comprise a plurality of content items (e.g., plural episodes spanning multiple DVD discs). Alternatively, a DVD movie disc within a set of related movies may comprise multiple content items. For instance, the "Fellowship of the Ring" content item may comprise multiple DVD discs.

Selection a group content item display (e.g., 612A or 612B) may cause another group content item display similar to 610A to be presented. For example, as described above, an extended edition of a DVD movie, such as the "Fellowship of the Ring" that is within a "Lord of the Rings" group may itself span multiple DVDs. As such, the content item display associated with the "Fellowship of the Ring" content item (e.g., display 612A) may also refer to a content item group. Selection of the display may cause another group content item display (not shown) to be presented.

In the content item group control 610B example, the content item group may be organized into one or more sub-groups 613B and 615B. Some content may be naturally arranged into an organization comprising groups and sub-groups. For example, a group comprising television program content items may be arranged into groupings based on a season of the television program and one or more episodes and/or DVDs within respective seasons. For instance, in the 610B example, the group 610B may include episodes of "Lost."

The sub-group control 613B may include content from the first season of "Lost" and may be entitled "Season 1." The content items within the sub-group control 613B may include DVDs and/or episode listings 614A-614B of the first season of "Lost." Similarly, the second sub-group control 615B may include content from the second season of "Lost" and may be entitled "Season 2." The content items within the sub-group control 615B may include DVDs and/or episode listings 616A-616B of the second season of "Lost"

Figure 7:
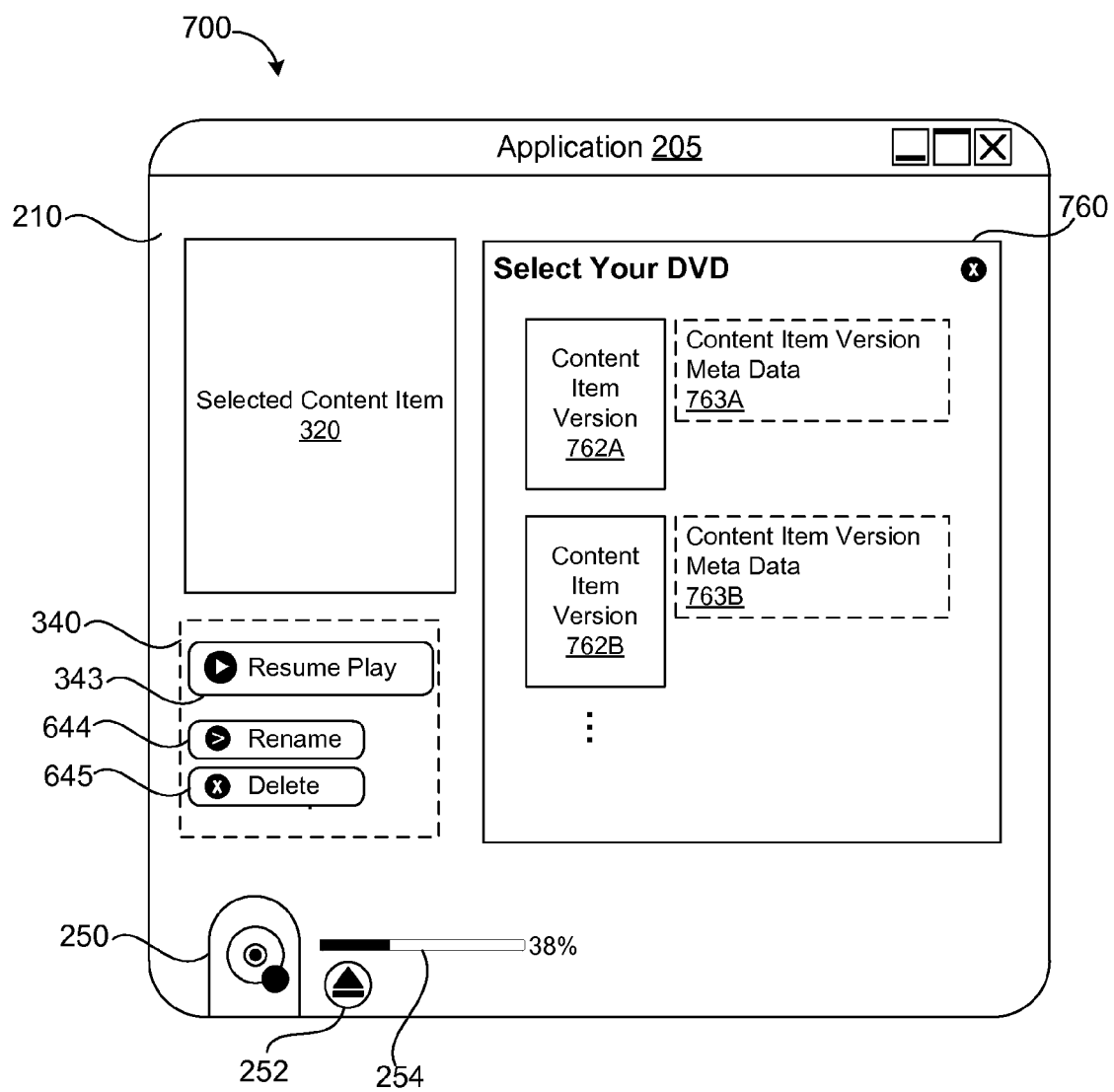
FIG. 7 is one embodiment of a user interface to allow a user to select one of a plurality of content item versions.

FIG. 7 is one embodiment of a user interface 700 for selecting an appropriate set of metadata for a particular content item. As discussed above, in some embodiments, the application 205 may be configured to obtain metadata from a remote metadata provider accessible via a network (e.g., remote metadata provider 122 of FIG. 1). In other embodiments, a local metadata provider may be used (e.g., metadata may be provided in storage media accessible to the application). In some embodiments, the application 205 may be configured to query a metadata provider to obtain metadata therefrom using a media identifier. The media identifier may be derived from properties and/or attributes of the content item and/or media associated with the content item, such as the content item title, filename, table of contents, run time, or the like. The media identifier may be transmitted to the metadata provider in a request for metadata information. In addition, the media identifier may be transmitted to other services that require uniquely identifying a particular content item (e.g., content item ratings services or the like).

Existing media types (e.g., CDs and DVDs) may be used in conjunction with identification systems and/or services provided by a metadata service, such as AMG®, Gracenote®, or the like. These services may take advantage of structural features related to the physical media on which content item is stored (e.g., the encoding of the content item on the media). For instance, such systems may compute or compile a number, string, XML file or other record or encoding based on and/or comprising structural information about the content item, such as a number of tracks, titles, start times and/or locations, length, and other structural metadata. This information is often derived from the table of contents, which may be found encoded in or otherwise associated with the physical media. The resulting data (e.g., number, string, XML, or other record or encoding) is associated with known content encodings in a database. Such systems, however, may recognize two different discs as being the same if the discs merely have the same structure (which may occur, for example, when one disc structure is used as the template for a set of discs, each of which inserts different content within the structure) or if the resulting number, string, XML file or other record or encoding is sufficiently similar to that of another content encoding.

Other systems may utilize audio fingerprinting or similar properties of the media and/or content item to characterize a content item independently of such structural information. However, such systems often require processing a large amount of data.

Various media types, such as CDs, DVDs, and other encodings of content often include a checksum and/or disc identifier, which may be derived from the binary data recorded on the media. Examples of such checksums include the output of cyclic redundancy check (CRC) functions, which often are designed to output a 32-bit integer which may be used as a data (or other) integrity check.

In some embodiments, a unique media identifier may be derived from the checksum found in association with the content encoding and the structure and/or label information found in or otherwise associated with the physical media of a particular content item. This unique media identifier may comprise a combination of information items, such as a concatenated string or other data type comprising the checksum, content encoding, content structure, and/or content item label. Alternatively, the media identifier may be derived by computing a hash of the information using a hashing algorithm, such as SHA1, MD5, or the like. In this case, the checksum, content encoding, structure, and/or label information may be input into the hashing algorithm that may produce a unique data value of fixed size.

In some embodiments, a hash of other content item properties may be used as a media identifier. For example, the media identifier may be calculated by hashing a number, string, XML file or other record or encoding based on and/or comprising a number of tracks, titles, start times and/or locations, length, and other metadata (which may or may not include a checksum found in association with the content encoding) of the content item.

As discussed above, a media identifier and/or supplemental media identifier may be calculated by performing a hash of a number, string, XML file or other record or encoding based on and/or comprising a number of tracks, titles, start times and/or locations, length, and other metadata (which may or may not include a checksum found in association with the content encoding) associated with the content item to produce a number or string. The media identifier may be of fixed length, while the input to the hashing function used to generate the identifier (e.g., the number, string, XML file or other record or encoding) may be of arbitrary length.

The media identifier may be communicated to a metadata provider or other service (e.g., the metadata provider 122 of FIG. 1), which may perform a lookup and/or other search operation using the media identifier end/or using information derived or decoded from the media identifier. In some embodiments, the original data (e.g., XML metadata) used to generate the media identifier hash value may be determined (e.g., using a lookup or other means), and transmitted to the metadata provider. This may allow the metadata provider or other service to associate the media identifier (or XML metadata content) with known (or otherwise characterized) content encodings in a database. Communicating the media identifier and/or associated XML content may comprise appending the media identifier data (or encoding thereof) to a GET Uniform Resource Locator (URL) in a Hyper Text Transfer Protocol (HTTP) communication session. The media identifier and/or information derived or decoded therefrom may then be used as a database key, a search parameter, a key into a dictionary data structure, as an identifier in a URL for web data request, or the like etc.

After identifying the content item, the metadata provider, or other service, may be capable of providing relevant metadata to the application. Similarly, other types of services (e.g., a ratings service or the like), may be able to associate user ratings and/or obtain user ratings associated with the content item.

However, in some cases, the metadata provider or other service may be unable to uniquely identify the content item using the media identifier. This may be due to the fact that the metadata provider or other service is not capable of consuming a media identifier comprising sufficiently unique information (e.g., the metadata provider or other service may only be capable of looking up content encodings using title and/or table of contents information). This may cause naming collisions between similar content items. For instance, some content items may have many various similar versions. For instance, a particular DVD movie may have a "special edition," a "collector's edition," an "extended edition," and the like. Each of the DVD versions may have a similar title and/or table of contents. Accordingly, a simplistic media identifier may be incapable of uniquely identifier the particular content item the user possesses.

In this case, the metadata provider may be configured to transmit a disambiguation request to the user, which may allow the user to select one of a plurality of content items versions, Responsive to the selection, the metadata provider and/or application may obtain the metadata associated to the selection.

FIG. 7 is one embodiment of a user interface 700 for displaying a disambiguation request according to the teachings of this disclosure. The interface 700 may include a disambiguation control 760, comprising a plurality of content item version displays 762A-762B. Each of the displays 762A-762B may correspond to a possible match to the selected content item (e.g., identified by the selected content item display 320). In addition, metadata associated with each respective content item version may be displayed at 763A-763B. The metadata displays 763A-763B may assist the user in selecting the appropriate content item version.

FIG. 7 also shows additional controls 644 and 645. The control 644 may allow a user to rename a content item (e.g., change the title of the content item as stored by the application or the like). The control 645 may delete the content item.

Figure 8:
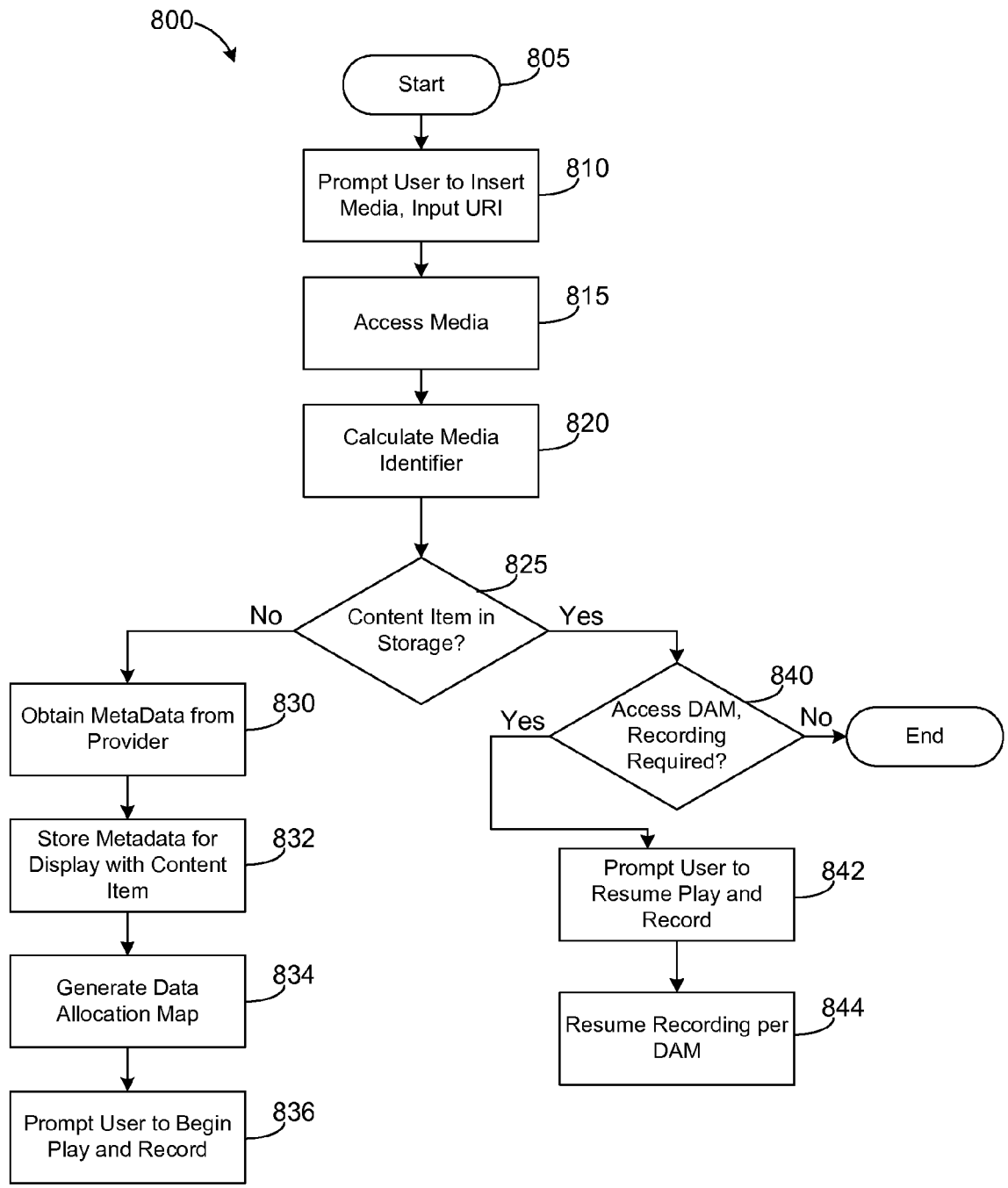
FIG. 8 is a flow diagram of one embodiment of a method for recording a content item.

FIG. 8 is a flow diagram of one embodiment of a method for playing and recording a content item. At step 805, the method may be initialized, which may include allocating and/or initializing resources required by the method 800, such as memory, data storage locations, network connections, and the like.

At step 810, a user may be prompted to provide a content item to the method 800. This may include inserting a disc, such as a DVD, into a media reader accessible to the method 800. Alternatively, or in addition, step 810 may include providing a URI or other identifier from which the content item may be downloaded and/or streamed.

At step 815, the method 800 may access the media via a media reader and/or network connection.

At step 820, a media identifier associated with the content item may be calculated. As discussed above, the media identifier may be encoded into the media and/or network stream associated with the content item. Alternatively, or in addition, the media identifier may be derived from attributes of the content item, such as a title of the content item, a table of contents of the content item, a digest and/or signature of the content item data, or the like.

At step 825, the method 800 may determine whether the content item (or a portion of the content item) associated with the identifier has been previously recorded. This may include searching for a record of the media identifier in a database, file storage location, or the like. If the content item has not been previously accessed, or a record of the content item has been deleted, the flow may continue to step 830; otherwise, the flow may continue to step 840.

At step 830, metadata associated with the content item may be obtained. In some embodiments, the method 800 may be configured to query a remote metadata provider to obtain metadata related to the content item. In this case, the method 800 may request metadata from a remote metadata provider using the media identifier calculated at step 820 using a network or some other communications means. The remote metadata provider may respond to the query with the metadata and/or with a disambiguation request, if the provider is unable to uniquely identifier the content item using the information provided by the method 800. The disambiguation request may prompt to select one of a plurality of possible content item matches. One example of a user interface for presenting such a disambiguation request is described above in conjunction with FIG. 7. After selecting one of the content items, the remote metadata provider may transmit the metadata to the method 800.

The metadata obtained at step 832 may be stored at step 832. The storage of step 832 may associate the metadata with the media identifier and/or the recorded content item.

At step 834, a data allocation map (DAM) of the content item may be determined. The DAM may include a data structure describing the data layout of the content. Some types of content items have a defined data structure. For example, a DVD disc may include a plurality of sectors arrayed within one or more cells. Similarly, a content item transmitted via a network via a protocol, such as, BitTorrent or the like may include a plurality of contiguous "chunks." The DAM may include a corresponding data structure to allow the method 800 to track which portions of the content item have recorded and which have not.

At step 836, the user may be prompted to begin recording the content item. In some embodiments, the method 800 may not begin recording the content item until instructed to do so by the user. In other embodiments, the method 800 may begin recording the content item as soon as it is inserted into a media reader and/or accessible via a network. If the user subsequently ejects the media and/or indicates that he/she does not wish to record the content item, the recording stored by the method 800 may be removed.

At step 840, a DAM associated with the content item may be accessed. The DAM may indicate which portions (if any) of the content item have not been recorded. If the entire content item has been recorded, the flow may terminate; otherwise, the flow may continue to step 842.

At step 842, the user may be prompted to resume recording and/or playing and recording the content item. If the user elects to resume recording, the method 800 may resume recording the content item according to the DAM. That is, the method 800 may record only those portions that the DAM indicates are lacking.

Figure 9:
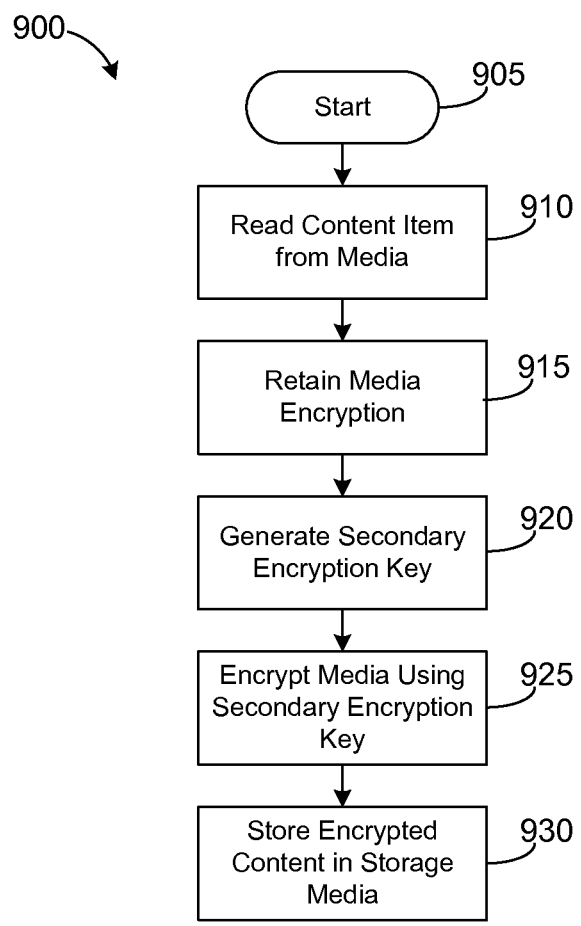
FIG. 9 is a flow diagram of one embodiment of a method for securing a recorded content item.

FIG. 9 is a flow diagram of one embodiment of a method for securing recorded content item to prevent unauthorized playback and/or sharing of a recorded content item. At step 905, the method 900 may be initialized, which may include allocating resources and/or initializing resources required by the method 900.

At step 910, a content item may be read and recorded substantially as described above in conjunction with FIG. 8. In many cases, the content item recorded at step 910 may be scrambled using an encryption algorithm, such as CSS, AACS, BD+, or the like. Authorized readers of such content may include a primary key allowing the reader to decrypt the content item for playback. These keys may be hard coded or otherwise obscured to prevent authorized decryption and/or dissemination of the content item.

At step 915, the encryption on the content item may be retained. Accordingly, the recording stored on the storage media by the method 900 may be encrypted as if it were still on its original media (e.g., on the disc).

At step 920, a secondary encryption key may be generated. This encryption key may be derived from various parameters of the method 900. For example, the encryption key of step 920 may be derived from and/or related to a license key of the method 900. Alternatively, or in addition, the secondary encryption key may include information tied to a particular computing device on which the method 900 is executed. Such information may include one or more hardware identifiers of the computing device, such as a fixed disc identifier, a media access control (MAC) address of a network interface associated with the computing device, or the like. Alternatively, or in addition, the key may be hard coded into the method 900. In this case, the licensing and/or hardware identification information may be encoded into a digital signature or other data filed within the recorded content item. As will be discussed below, the secondary encryption key of step 920 may be used to control and/or restrict the playback of the recorded content item to those users who are authorized to access the content item.

At step 925, the secondary encryption key may be used to encrypt the content item. The encryption key generated at step 920 may be a symmetric key. Accordingly, the encryption of step 925 may include a stream cipher, such as RC4, Blowfish, or the like. Alternatively, the secondary encryption key may include an asymmetric key and/or may support the use of other cipher types and/or a digital signature. Although examples of various key and cipher types as discussed herein, one skilled in the art would recognize that the teachings of this disclosure may be practiced using any key type in conjunction with any cipher type known in the art.

At step 930, the content (encrypted using the original content protection encryption, as well as the secondary encryption of step 925) may be stored in a storage location accessible to the method 930. The storage location may include a fixed disc (e.g., hard disc) a solid-state disc, a network accessible storage location (e.g., cloud storage), or any other data storage location known in the art.

Figure 10:
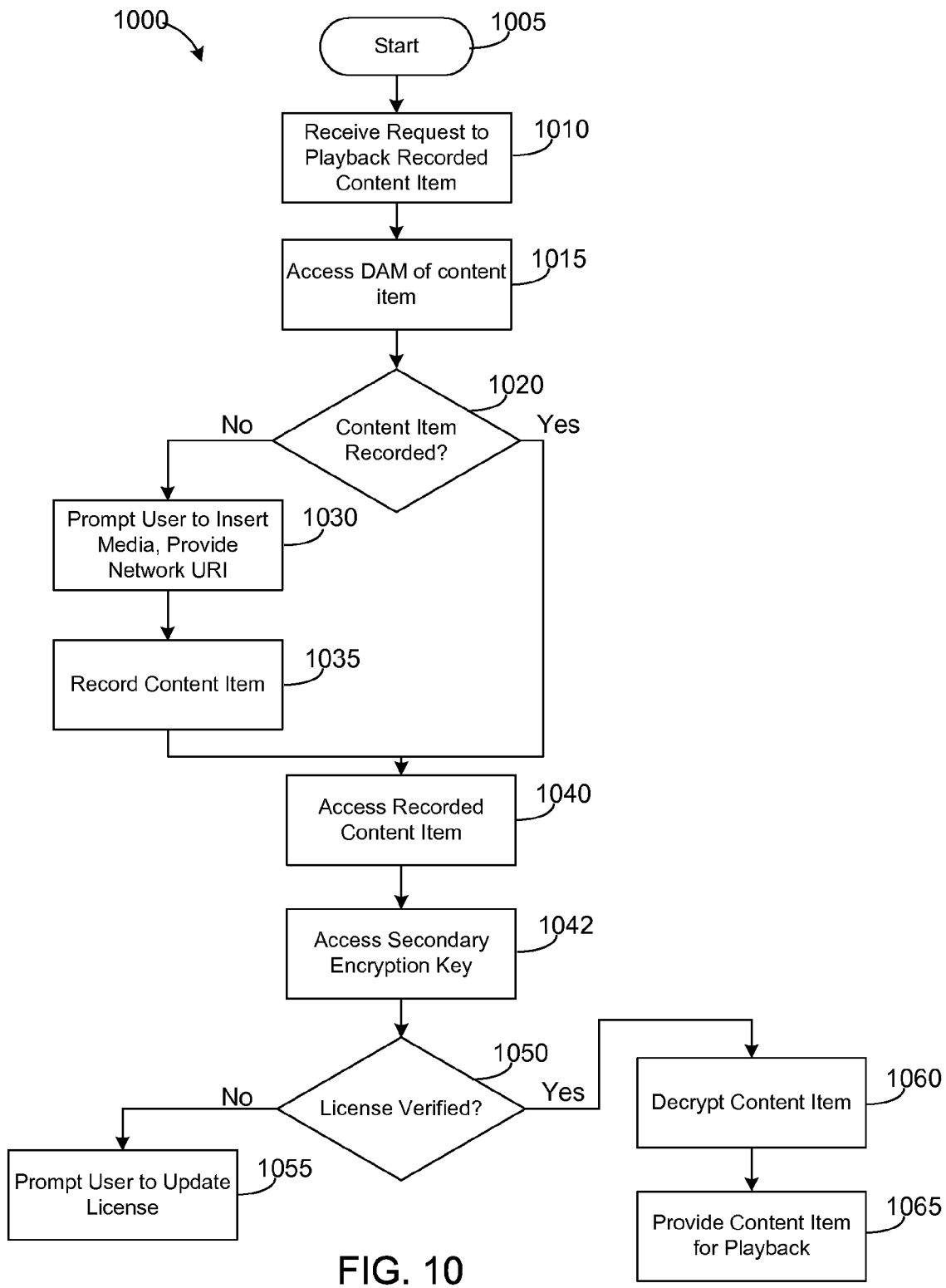
FIG. 10 is a flow diagram of one embodiment of a method for preventing unauthorized playback of a recorded content item.

The encryption of steps 915 and 925 may prevent unauthorized access to the content item. FIG. 10 depicts one embodiment of a method 1000 for accessing a content item stored according to the teachings of this disclosure (e.g., stored using method 900 of FIG. 9).

At step 1005, the method 1000 may be initialized, which may include allocating and/or initializing resources required by the method 1000.

At step 1010, a request for a content item may be received. The request may include a media identifier and/or an offset within the content item (e.g., a chapter identifier, an episode, a bookmark, or the like).

At step 1015, the content item and/or a DAM associated with the content item may be obtained from a storage location accessible to the method 1000. As discussed above, the storage location may include any data storage means known in the art. The method 1000 may lookup the content item using the media identifier within the request received at step 1010.

At step 1020, the method 1000 may determine whether content item has been recorded and/or whether the portion of the content item requested by the user is available. If so, the flow may continue to step 1040; otherwise, the flow may continue to step 1030.

At step 1030, the user may be prompted to insert the content item media (e.g., DVD disc or the like) and/or provide a URI from which the content item may be obtained. This may allow the method 1000 to obtain the content item for playback. After receiving access to the content item, the content item may be recorded at step 1035 substantially as described above.

At step 1040, the recorded content item may be accessed. As discussed above, the content item may be stored in a storage location accessible to the method 1000, such as a hard disc, memory, a database, a network accessible storage location, or the like. The content item may be secured to prevent unauthorized access and/or playback to the content item. In some embodiments, the content item may be encrypted using a data content protection scheme, such as CSS, AACS, BD+, or the like. As discussed above, the recording may preserve any original encryption on the content item. In addition, and as described above, the content item may be encrypted using a secondary encryption key. At step 1042, the secondary encryption key may be accessed.

In some embodiments, the secondary encryption key may include and/or be tied to a license to the method 1000. The license may associate a particular instance of the method 1000 with a particular user and/or the content items recorded by the user. The licensing scheme may prevent other users from accessing the content items recorded by the user. In some cases, the licensing scheme may allow a user to access recorded content item using a pre-determined number of computing devices. Computing devices may be registered with a licensing server (not shown). At step 1050, the method 1000 may determine whether the license associated with the instance of the method 1000 corresponds to a license associated with the content item. If so, the flow may continue to step 1060; otherwise, the flow may continue to step 1055.

At step 1055, the user may be informed that he/she is not authorized to access the content item. If the license and/or content item indicate that additional computing devices may be authorized to access the content, the user may be prompted to "activate" the 1000 method instance. If the user elects to do so, the user may be allowed to access the content item at step 1060; otherwise, the flow may terminate.

At step 1060, the content item may be decrypted using the secondary encryption key. In addition, at step 1060, any content item protection may be removed using the primary key (e.g., the CSS or BD+ encryption may be removed). The decrypted (e.g., clear text) content may be provided for playback at step 1065.

In an alternative embodiment, the primary key is used to decrypt the content item prior to being recorded in step 1035. In such an embodiment, step 1060 only decrypts the content item using the secondary key.

In some cases, a user may begin playback and/or recording of a content item, but stop the recording before completion. In this case, the DAM may be used to resume recording where the user left off. One embodiment of a method to provide this capability is method 800 described above.

To further improve recording efficiency, the application may be configured to determine which portions of the content item include playback content and which do not. For example, one or more media "cells" within the media may include one or more damaged or otherwise unreadable sectors, also referred to herein as "bad" sectors. Each of the bad sectors may cause the recording process to time out waiting for the bad sector to be copied. These successive timeouts may cause the recording process to fail or take a long time.

In some embodiments, the reader module (such as the reader module 112 of FIG. 1) may be configured to detect bad sectors on the media. Upon detecting bad sectors, the recording process may skip ahead in the media and/or stream to "good" data to thereby continue recording the content item.

Figure 11:
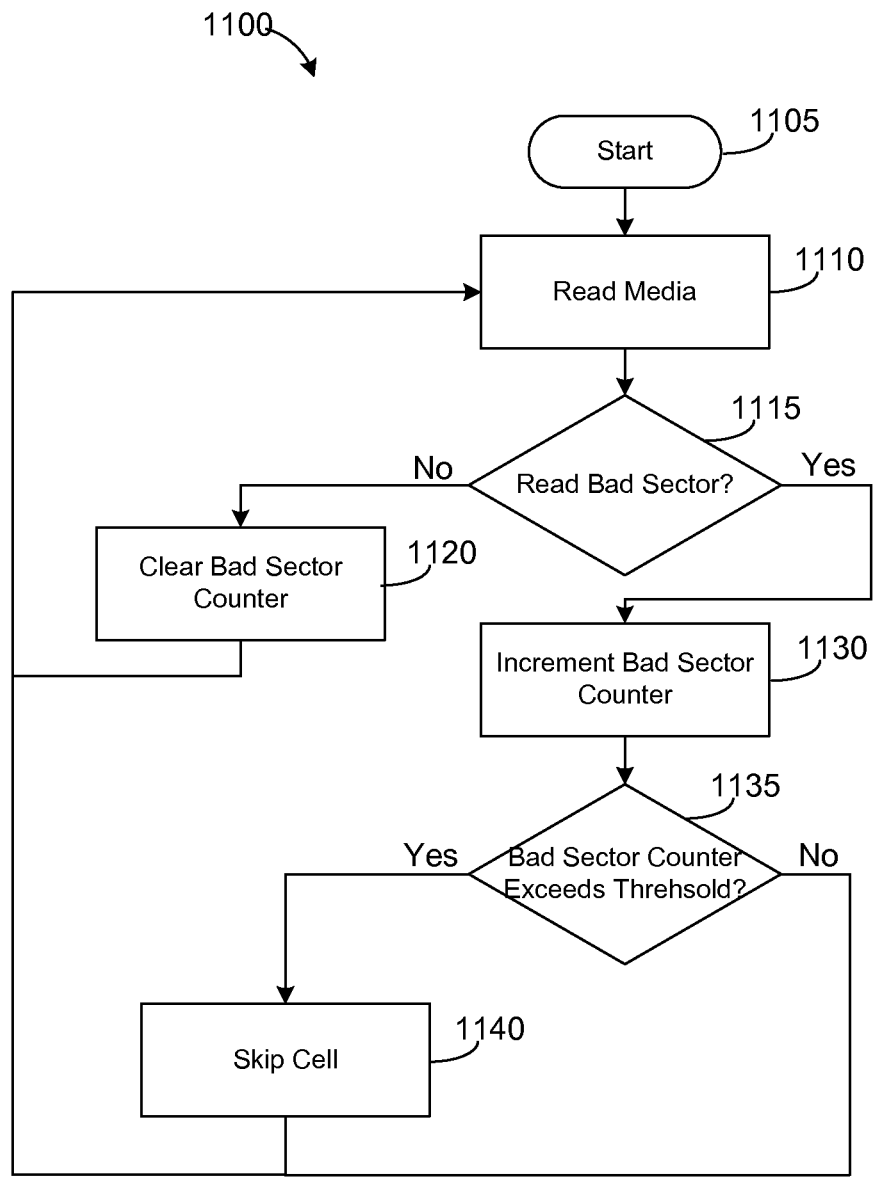
FIG. 11 is a flow diagram of one embodiment of a method for detecting a bad.

FIG. 11 is one embodiment of a method 1100 for correcting errors introduced by bad cells.

At step 1105, the method 1100 may be initialized, which may include allocating and/or initializing resources required by the method 1100, such as accessing a DVD media reader or the like.

At step 1110, the content item may be read from the media reader. At step 1115, a bad sector within the media may be encountered. In the 1100 embodiment, the media may include a DVD disc that is organized into one or more cells, wherein each of the cells includes a plurality of sectors. The method 1100 may be configured to use a counter approach. Bad sectors may or may not be indicative of a bad cell such that there can be a threshold number of consecutive bad sectors in a cell. As such, the method 1100 may keep a running count of bad sectors within a particular cell. If more than the threshold number of bad sectors within a particular cell are detected, the method 1100 may determine that the cell is a bad cell, and may skip the cell.

At step 1115, the method 1100 may determine whether the current sector is a "bad sector" (e.g., a sector that cannot be read and/or causes the media reader to time out). If the sector is bad, the flow may continue at step 1130; otherwise, the flow may continue to step 1120.

At step 1120, a bad sector counter may be cleared. This may prevent separate and/or non-contiguous bad sectors on the media from triggering a bad cell detection.

At step 1130, the bad sector counter may be incremented. At step 1135, the bad sector counter may be compared to a threshold value. In some embodiments, the threshold value may be ten (10), which corresponds to an observed maximum number of bad sectors that may not indicate a bad cell. Alternatively, or in addition, the threshold value of step 1130 may be user-selectable. If the counter value exceeds the threshold, the flow may continue to step 1140; otherwise, the flow may continue to step 1130.

At step 1140, the method 1100 may determine that the bad sector is contained within a bad cell. As such, the method 1100 may skip the cell and continue reading the media at the next cell at step 1110.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable medium having stored instructions thereon that may be used to program a computer (or other electronic device) to perform processes described herein. The computer-readable medium may include, but is not limited to, hard drives, floppy diskettes, optical discs, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that perform one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A method comprising:
   using a computer to perform the steps of:
      detecting that a recorded medium including media content has been inserted into a media reader;
      copying the media content from the recorded medium to a storage device without a user command to copy the media content, wherein copying includes:
         tracking failed attempts to read one or more sectors of a particular cell in a bad sector counter, including:
            in response to encountering an unreadable sector, incrementing the bad sector counter for the particular cell; and
            in response to encountering a readable sector, clearing the bad sector counter for the particular cell;
         in response to the bad sector counter exceeding a threshold value for the particular cell:
            marking the particular cell as a bad cell, such that subsequent copying of the particular cell is not attempted;
            clearing the bad sector counter; and
            skipping to a next cell to continue reading the media content; and
      in response to a user command to play back the media content, retrieving and playing back the media content from the storage device,
      wherein at least a portion of the media content is played back from the storage device concurrently with the media content being copied from the recorded medium.

2. The method of claim 1, further comprising making the stored media content available for playback after the recorded medium has been removed from the media reader.

3. The method of claim 2, wherein making the stored media content available comprises:
   determining a media identifier associated with the recorded medium or media content;
   using the media identifier to obtain metadata relating to the stored media content through a network; and
   associating the metadata with the stored media content in the storage device, wherein at least a portion of the metadata is displayable in a user interface to enable selection of the stored media content.

4. The method of claim 1, wherein the recorded medium comprises a digital versatile disc (DVD).

5. The method of claim 1, wherein the media content is obtained from the recorded medium at a higher rate than the media content is output to a display device.

6. A non-transitory computer readable storage medium having thereon instructions, which when executed by a processor, cause the processor to perform a method comprising:
   reading media content from a recorded medium, wherein reading the media content comprises:
      tracking failed attempts to read one or more sectors of a particular cell in a bad sector counter, including:
         in response to encountering an unreadable sector, incrementing the bad sector counter for the particular cell; and
         in response to encountering a readable sector, clearing the bad sector counter for the particular cell;
      in response to the bad sector counter exceeding a threshold value for the particular cell:
         marking the particular cell as a bad cell, such that subsequent copying of the particular cell is not attempted;
         clearing the bad sector counter; and
         skipping to a next cell to continue reading the media content;
   storing the media content, not including cells that have been marked as a bad cell, in a storage device concurrently with reading the media content; and
   playing back the media content from the storage device concurrently with storing the media content,
   wherein the reading, storing, and playing back of the media content are initiated by a single user command.

7. The non-transitory computer readable storage medium of claim 6, wherein the single user command is a command to play back the media content from the recorded medium.

8. The non-transitory computer readable storage medium of claim 6, wherein the method further comprises:
  making the stored media content available for subsequent playback without the recorded medium by:
    determining a media identifier associated with the recorded medium or media content;
    using the media identifier to obtain metadata relating to the stored media content through a network; and
    associating the metadata with the stored media content in the storage device, wherein at least a portion of the metadata is displayable in a user interface to enable selection of the stored media content.

9. A system comprising:
  a reader to read media content from a recorded medium, wherein the reader is configured to:
    track failed attempts to read one or more sectors of a particular cell in a bad sector counter, including:
      in response to encountering an unreadable sector, increment the bad sector counter for the particular cell; and
      in response to encountering a readable sector, increment the bad sector counter for the particular cell; and
    in response to the bad sector counter exceeding a threshold value for the particular cell:
      mark the particular cell as a bad cell, such that subsequent copying of the particular cell is not attempted;
      clear the bad sector counter; and
      skip to a next cell to continue to read the media content;
  a storage device to store the media content concurrently with the reading of the media content; and
  a playback component to play back the media content from the storage device concurrently with the storing of the media content,
  wherein the reading, storing, and playing back of the media content are initiated by a single user command.

10. The system of claim 9, wherein the recorded medium comprises a digital versatile disc (DVD).

11. The system of claim 9, wherein the media content is obtained from the recorded medium at a higher rate than the media content is output by the playback component.

12. The system of claim 9, further comprising a user interface component to make the stored media content available for subsequent playback without the recorded medium.

13. The system of claim 12, further comprising a metadata component configured to:
  determine a media identifier associated with the recorded medium or media content;
  use the media identifier to obtain metadata relating to the stored media content through a network; and
  associate the metadata with the stored media content in the storage device, wherein at least a portion of the metadata is displayable in the user interface to enable selection of the stored media content.

* * * * *